US006951031B2

(12) United States Patent
Hatano

(10) Patent No.: US 6,951,031 B2
(45) Date of Patent: Sep. 27, 2005

(54) APPARATUS FOR AND METHOD OF RECORDING PROGRAM INFORMATION

(75) Inventor: Ichiro Hatano, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 990 days.

(21) Appl. No.: 09/735,517

(22) Filed: Dec. 14, 2000

(65) Prior Publication Data

US 2001/0021995 A1 Sep. 13, 2001

(30) Foreign Application Priority Data

Mar. 10, 2000 (JP) .................................... P2000-072464

(51) Int. Cl.[7] .......................... H04N 5/445; H04N 5/91; H04N 7/173; G06F 3/00; G06F 13/00

(52) U.S. Cl. ............................ 725/50; 725/39; 725/55; 725/58; 725/91; 725/141; 386/83; 348/460

(58) Field of Search ............................. 386/83; 725/58, 725/39, 50, 55, 141, 86, 88, 91, 93; 348/460

(56) References Cited

U.S. PATENT DOCUMENTS 5,488,409 A * 1/1996 Yuen et al. .................... 386/83
5,841,433 A * 11/1998 Chaney ........................ 725/50
5,852,478 A * 12/1998 Kwoh .......................... 386/83
5,956,455 A * 9/1999 Hennig ......................... 725/58
5,963,264 A * 10/1999 Jackson ....................... 348/460
6,549,718 B1 * 4/2003 Grooters et al. .............. 386/83
6,832,387 B2 * 12/2004 Grooters et al. .............. 725/39

* cited by examiner

*Primary Examiner*—John Miller
*Assistant Examiner*—Michael W. Hoye
(74) *Attorney, Agent, or Firm*—Sughrue Mion, PLLC

(57) ABSTRACT

An apparatus for recording program information is provided with a program information obtaining device, a program guide providing device, a storing device, a reception contents recording device, a newest program information obtaining device, and a program information recording device. In the apparatus, the program information obtaining device obtains program information including at least program names, broadcast start times, program lengths or program end times, and broadcast channels of a plurality of programs. The program guide providing device provides a program guide to a user on the basis of the obtained program information. The storing device stores the obtained program information. The reception contents recording device receives the broadcast channel of the selected program in a period within the program length after the broadcast start time, or in a period by the broadcast end time from the broadcast start time, and recording the reception contents, at the stored broadcast start time. The newest program information obtaining device newly obtains the program information regarding the selected program in a period while the reception contents are recorded. The program information recording device records the newly obtained program information.

14 Claims, 17 Drawing Sheets

| Category | Media | Data and Time | CH | Program | Information |
|---|---|---|---|---|---|
| Record | VTR<br>DVD | May 13, 2000 (Sat)<br>8:00P.M -9:00P.M | 120 | Movie Theater | Title<br>Featuring ····<br>Nation ····<br>Release ···· |
| Record | HD | May 14, 2000 (Sun)<br>9.00P.M.-11.00P M. | 120 | Six | Title<br>Featuring ····<br>Nation ····<br>Release ···· |
| View | | May 19, 2000 (Fri)<br>7.00P.M.-8:00P.M. | 100 | German Conversation | Title Past Tense<br>Lecturer ···· |

FIG. 14A 80 81 82

| Media | Data and Time | CH | Program | Information |
|---|---|---|---|---|
| HD | March 10, 2000 (Fri)<br>8:00P.M.-9:00P.M. | 100 | English<br>Conversation | Title Past Tense<br>Lecturer .... |
| VTR<br>DVD | May 13, 2000 (Sat)<br>9:00P.M.-11:00P.M. | 120 | Movie<br>Theater | Title<br>Featuring ....<br>Nation ....<br>Release .... |
| .... | .... | ... | .... | .... |

FIG. 14B 80 81 82

| Media | Data and Time | CH | Program | Information |
|---|---|---|---|---|
| HD | March 10, 2000 (Fri)<br>8:00P.M.-9:00P.M. | 100 | English<br>Conversation | Title Past Tense<br>Lecturer .... |
| VTR<br>DVD | May 13, 2000 (Sat)<br>9:00P.M.-11:00P.M. | 120 | Special Program | Title News Report |
| | | | Movie<br>Theater | Title<br>Featuring ....<br>Nation .... |
| .... | .... | ... | .... | .... |

83

84

APPARATUS FOR AND METHOD OF RECORDING PROGRAM INFORMATION

BACKGROUND OF THE INVENTION

1. Field of the Invention

The present invention relates to the field of a programming system to record programs transmitted in accordance with a schedule, such as television programs and the like, and more particularly relates to a technique for recording the programs with information about them for search or reference afterward.

2. Description of the Related Art

A conventional apparatus for receiving and recording television (TV) programs broadcast by a broadcasting station have programming capability to record the programs. At a set time a set channel is received and a program on the channel is automatically recorded in the apparatus.

There are several ways of selecting the program to record in this kind of apparatus. For example, Japanese Laid Open Patent Application (JP H10-257449) discloses the following method. At first data of an electronic program guide (EPG), which is transmitted from a broadcasting station by using a CATV circuit, is displayed on a TV screen or the like. Then a user selects a desirable program on the EPG and sets the time to record the selected program. Further, Japanese Laid Open Patent Application (JP H10-257449) discloses the following system. At first an EPG data obtained on the Internet is displayed on a screen of a personal computer or the like. Then a user selects a desirable program on the EPG and sets the time to record the selected program.

Moreover, another system, which records the program and the information about the program at a time of selecting the program to record, for example, a title of a program, a broadcast time, contents of the program and the like included in the EPG data, is well known. In the system, the information about the program is recorded corresponding to the recorded program, and displayed on the TV screen and the like afterward so that a user can easily find the recorded program.

However, in the conventional system, if the information about the program, such as a broadcast time of the program and the like, is changed in the period between the setting of programming for recording and the set time, the change takes no effect on the recording of the information about the program. Accordingly, the information displayed on the TV screen at a time of searching the recorded program is inaccurate, so that some difficulties are occurred on searching the recorded program.

SUMMARY OF THE INVENTION

It is therefore an object of the present invention to provide an apparatus for and a method of recording a program information, which can provide new program information to a user after the change, even if a program information is changed by a set time after the programming for recording the program is set.

The above object of the present invention can be achieved by an apparatus for recording program information. The apparatus has a program information obtaining device, a program guide providing device, a storing device, a reception contents recording device, a newest program information obtaining device, and a program information recording device. The program information obtaining device obtains program information including at least program names, broadcast start times, program lengths or program end times, and broadcast channels of a plurality of programs. The program guide providing device provides a program guide to a user on the basis of the obtained program information. The storing device stores at least the broadcast start time, the program length or the broadcast end time, and the broadcast channel with regard to a program selected by the user on the basis of the provided program guide. The reception contents recording device receives the broadcast channel of the selected program in a period within the program length after the broadcast start time, or in a period by the broadcast end time from said broadcast start time, and records the reception contents, after the stored broadcast start time. The newest program information obtaining device newly obtains the program information with regard to the selected program in a period while the reception contents are recorded. The program information recording device records the newly obtained program information.

According to the apparatus of the present invention, after the program information is obtained once, the new program information is obtained and the former program information is renewed by the new program information. Therefore, if the program information is changed in the period between the time of setting of programming for recording the program and the broadcast start time, the newest information after the program information is changed can be recorded.

In one aspect of the apparatus of the present invention, the reception contents recording device receives the broadcast channel of the selected program and records the reception contents in accordance with a changed program length or a changed the broadcast end time if the program length of the broadcast time or the broadcast end time included in the newly obtained program information by the newest program information obtaining device is changed against the program length of the broadcast time or the broadcast end time included in the obtained program information by the program information obtaining device.

According to this aspect, even if the program length of the broadcast time or the broadcast end time is changed in the period between the time of setting of programming for recording the program and the broadcast start time, recording the reception contents of the program can be performed without finishing before the broadcast end time.

In another aspect of the apparatus of the present invention, the apparatus further has a reception contents providing device. The reception contents providing device provides reception contents of the program recorded by the reception contents recording device to the user on the basis of the program information recorded by the program information recording device.

According to this aspect, if the program information is changed in the period between the time of setting of programming for recording the program and the broadcast start time, the reception contents of the program in accordance with the changed program information can be provided to the user.

In another aspect of the apparatus of the present invention, the newest program contents information obtaining device obtains the program information in regard to the selected program in addition to the period for recording the reception contents by the reception contents recording device.

According to this aspect, if the program information is changed, the changed program information can be always provided to the user.

The above object of the present invention can be achieved by a method of recording program information. The method has the processes of obtaining program information, the processes of providing a program guide to a user, the processes of storing program information, the processes of receiving the broadcast channel of the selected program, the processes of newly obtaining the program information, and the processes of recording the newly obtained program information.

According to the method of the present invention, program information including at least program names, broadcast start times, program lengths or program end times, and broadcast channels of a plurality of programs is obtained. Then a program guide is provided to a user on the basis of the obtained program information. Further, the obtained program information including at least the broadcast start time, the program length or the broadcast end time, and the broadcast channel with regard to a program selected by the user on the basis of the provided program guide is stored. Moreover, after it becomes the stored broadcast start time reached, the broadcast channel of the selected program is received in a period within the program length after the broadcast start time, or in a period by the broadcast end time from said broadcast start time. Then the program information with regard to the selected program is newly obtained in a period while the reception contents are recorded, and the newly obtained program information is recorded. Therefore, if the program information is changed in the period between the time of setting of programming for recording the program and the broadcast start time, the newest information after the program information is changed can be recorded.

In one aspect of the method of the present invention, the process of recording reception contents receives the broadcast channel of the selected program and records the reception contents in accordance with a changed program length or a changed the broadcast end time if the program length of the broadcast time included in the newly obtained program information by the process of obtaining the newest program information is changed against the program length of the broadcast time included in the obtained program information by the process of obtaining the program information.

According to this aspect, even if the program length of the broadcast time or the broadcast end time is changed in the period between the time of setting of programming for recording the program and the broadcast start time, recording the reception contents of the program can be performed without finishing before the broadcast end time.

In another aspect of the method of the present invention, the method further has the process of providing a reception contents of the program recorded by said process of recording the reception contents to the user on the basis of the program information recorded by the process of recording the program information.

According to this aspect, if the program information is changed in the period between the time of setting of programming for recording the program and the broadcast start time, the reception contents of the program in accordance with the changed program information can be provided to the user.

In another aspect of the method of the present invention, the process of obtaining newest program contents information periodically obtains newest program contents information in regard to the selected program in addition to the period for recording the reception contents by said process of recording the reception contents.

According to this aspect, if the program information is changed, the changed program information can be always provided to the user.

BRIEF DESCRIPTION OF THE DRAWINGS

FIG. 10 is a view showing an example of a programming contents list screen displayed on a display;

FIG. 14A is a view showing an example of a record contents list screen displayed on a display;

FIG. 14B is a view showing an example of a record contents list screen displayed on the display at a broadcast start time of a set program is changed;

DETAILED DESCRIPTION OF THE PREFERRED EMBODIMENT

A preferred embodiment of the present invention will be explained below with reference to the drawings.

Figure 1:
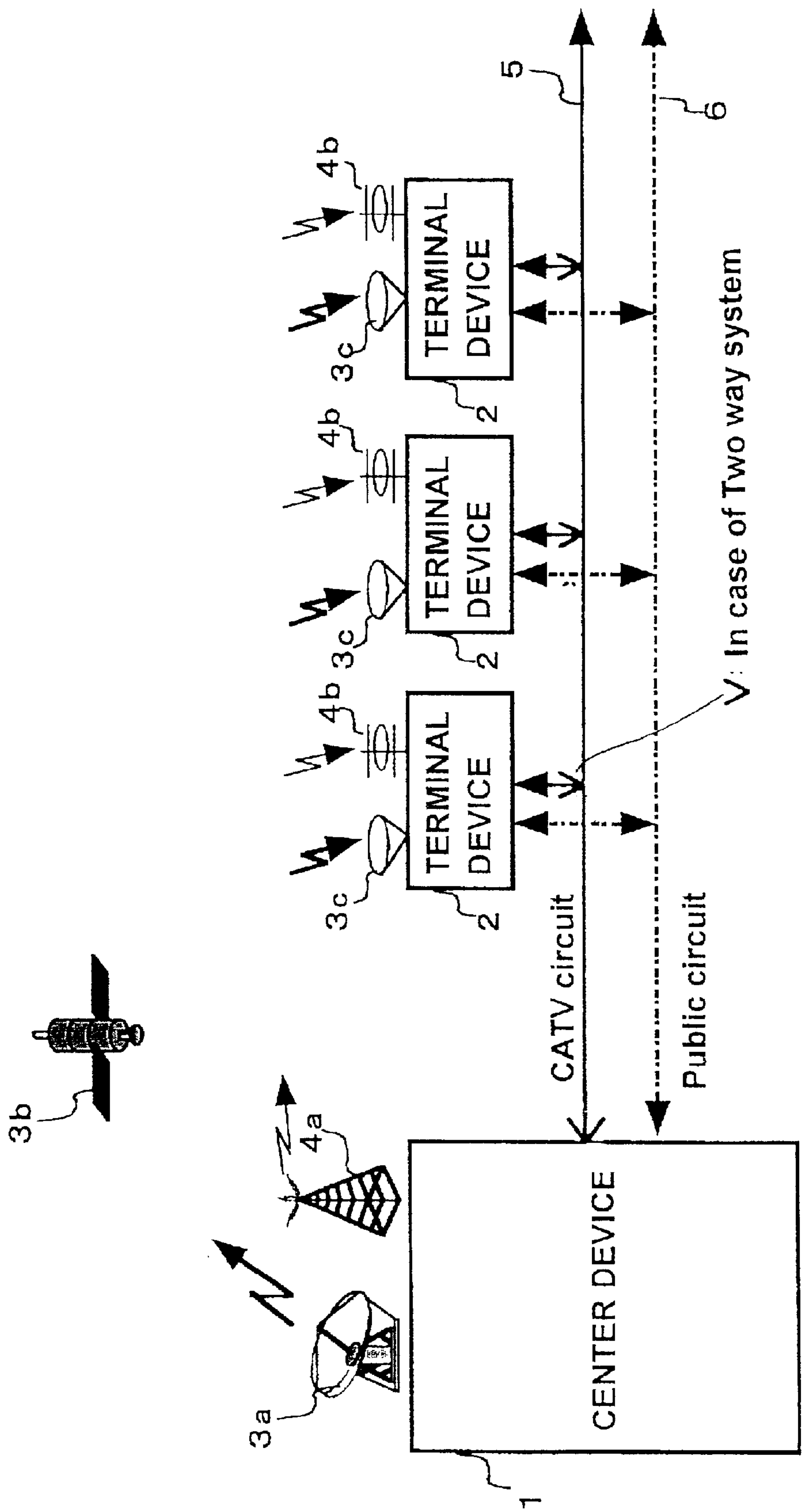
FIG. 1 is a block diagram showing a schematic configuration of a program broadcast system according to an embodiment of the present invention.

FIG. 1 shows the schematic configuration of a program broadcast system according to an embodiment of the present invention. A center device 1 shown in FIG. 1 is installed in a broadcasting station of a television (TV) program (hereinafter referred to as a program), and broadcasts the program by using an radio wave through a satellite 3*b*, a terrestrial wave, a CATV (Community Antenna Television or Cable Television) circuit 5 and the like. A terminal device 2, which is installed at a house of a viewer, receives a program broadcast signal (a broadcast wave) broadcast by the center device 1 of the broadcasting station, and displays the program on a screen of a later-described display 30 or a television receiver (hereinafter referred to as a TV) 33 (shown in FIG. 4), and also reproduces audio through a speaker. The center device 1 generates an electronic program guide (EPG) data as program information, and transmits it through a public circuit 6 to the terminal device 2, in response to a request from the terminal device 2. The terminal device 2 receives the EPG data sent by the center device 1, and displays it on the screen of the display 30 or the TV 33. In this embodiment, it is assumed that the transmission of the EPG data to the terminal device 2 from the center device 1 is performed through a WWW (World Wide Web) server of a provider (not shown). Moreover, although FIG. 1 shows one broadcasting station, it may be designed such that a plurality of broadcasting stations are set up and the center device 1 is installed for each broadcasting station. For example, it may be divided into a broadcasting station for broadcasting a program through a satellite, a broadcasting station for broadcasting a program by using a terrestrial wave and a broadcasting station for broadcasting a program through a CATV circuit.

Figure 2:
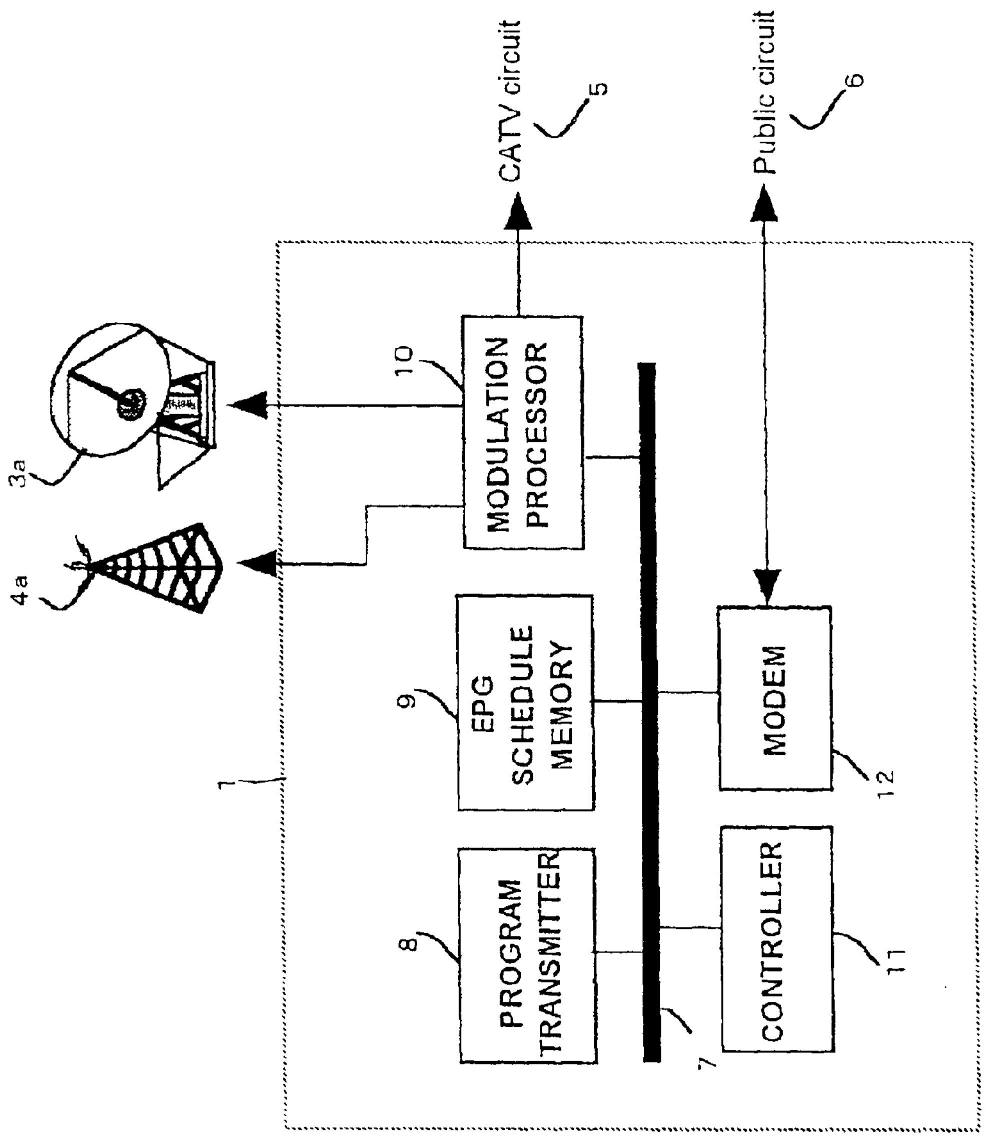
FIG. 2 is a block diagram showing a schematic function block of a center device according to an embodiment of the present invention.

FIG. 2 shows the schematic function block of the center device 1 in the embodiment of the present invention. As shown in FIG. 2, the center device 1 is configured such that various elements are connected to a bus 7. A program transmitter 8 transmits the program data, such as a live program, a news, a packaged medium recorded on a video tape, a re-transmission program received from another station (a program received from another station, which is broadcast in its original state although a channel conversion may be performed) and the like, to a modulation processor 10, at a predetermined time through a predetermined channel, in accordance with a program schedule that is set and stored in advance in an EPG schedule memory 9. At this time, the program transmitter 8 multiplexes such program data, for example, in accordance with a multiplex compression method based on MPEG (Moving Picture Experts Group) 2 and the like, and changes it into a compressed digital data in a form of packet (transport stream) and then transmits it. The transport stream means a transmission bit stream defined in the MPEG 2, and all data of images, audios and others are changed into packets each of which has a fixed length and transmitted. The compressed digital data transmitted by the program transmitter 8 is modulated by the modulation processor 10 using a digital modulation method, for example, 64 QAM (64 Quadrature Amplitude Modulation), and broadcast through antennas 3*a*, 4*a* or the CATV circuit 5. A program may be broadcast as an NTSC (National Television System Committee) signal, namely, an analog television signal used as a conventional standard broadcast method. As a method for broadcasting a program, there are a broadcast using a satellite (a broadcast from the antenna 3*a*), a broadcast using a conventional terrestrial wave (a broadcast from the antenna 4*a*), a broadcast using the CATV circuit 5 and the like.

A controller 11 shown in FIG. 2 edits the EPG data stored in the EPG schedule memory 9 in a form of home page (WEB page), and registers it on a WWW server of a provider (not shown). The EPG data includes the title of a program, a broadcast start time, a program length or a broadcast end time, a broadcast channel, accounting information, information about programming to record the program, a URL (Uniform Resource Locator) of a provider of the information about the program and the like. The URL is address information to designate a particular linked destination on the WWW. The EPG data is embedded in the home page registered on the WWW server of the provider, in the form of HTML (Hypertext Markup Language) or XML (Extensible Markup Language). The XML implies an extended markup language, and has an advantage in the capability for searching and linking to another application software. The terminal device 2 can access the home page registered on the WWW server of the provider, through the Internet.

Figure 3B:
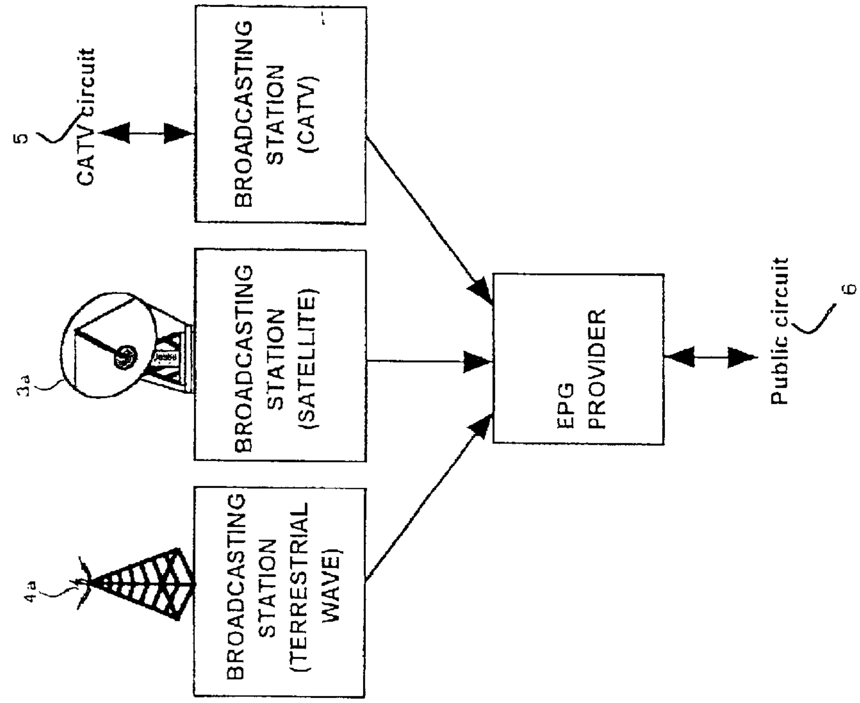
FIG. 3B is a block diagram showing a system for preparing and providing a home page for EPG from an EPG provider.
Figure 3A:
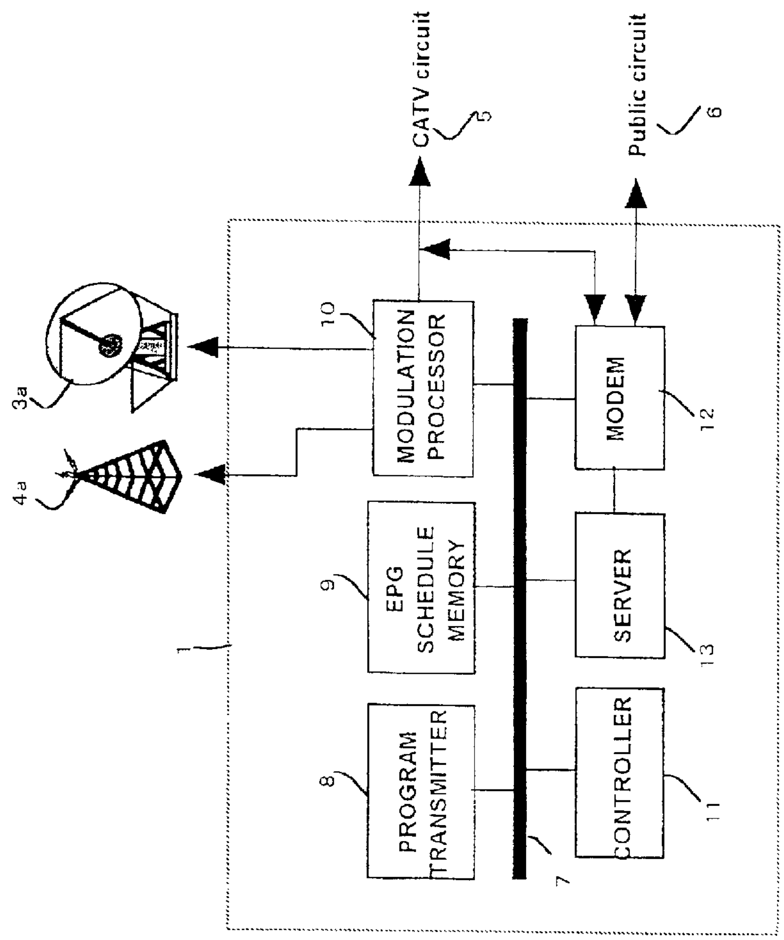
FIG. 3A is a block diagram showing another example of a schematic function block of a center device according to an embodiment of the present invention.

If two-way CATV system is used, the home page including the EPG data may be provided to the terminal device 2 by using two-way communication in a predetermined frequency band of the CATV circuit 5. For example, in FIG. 3A, a server 13 having the function of a provider is set up in the center device 1 so that the home page including the EPG data can be accessed through the CATV circuit 5 from the terminal device 2. Thus, the center device 1 can be utilized by the terminal device 2 as if it were a WWW server of a provider on the Internet. As shown in FIG. 3B, a provider of the EPG data may prepare and provide the home page including the EPG data of each broadcasting station. The center device 1 can transmit the EPG data requested through the CATV circuit 5 or the public circuit 6 from the terminal device 2, by using a terrestrial wave or a radio wave through the satellite 3*b*.

Figure 4:
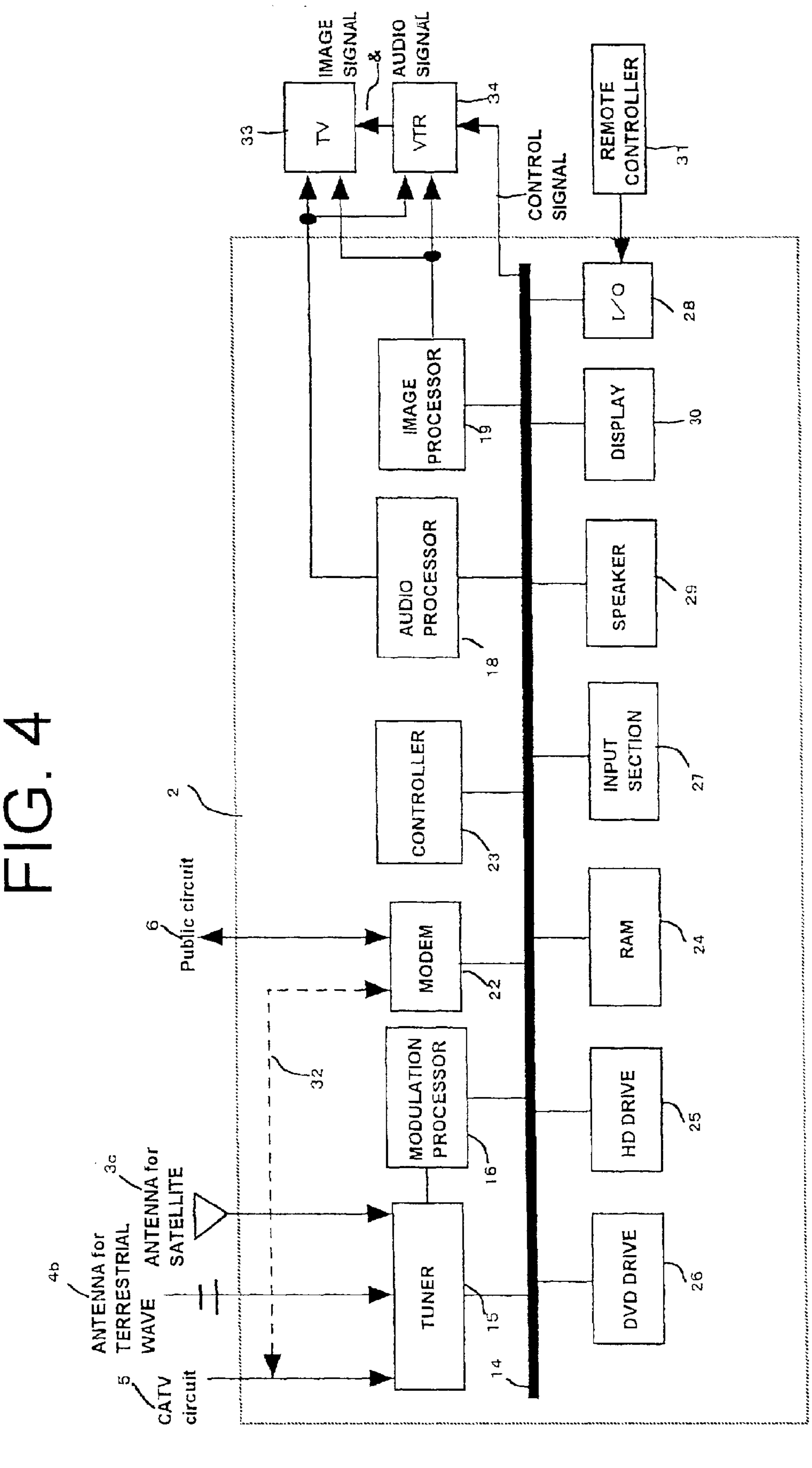
FIG. 4 is a block diagram showing a schematic function block of a terminal device according to an embodiment of the present invention.

FIG. 4 shows the schematic function block of the terminal device 2 in the embodiment of the present invention. As shown in FIG. 4, various elements are connected to a bus 14 in the terminal device 2. The terminal device 2 has a controller 23 with a CPU as a main element. The controller 23 controls the various elements in accordance with a signal from an input section 27 such as a keyboard, a mouse or the like, or an attached remote controller 31. For example, it controls the operation for receiving the programs and outputting image data or the EPG data to the display 30. It can also controls the operation for outputting image data, audio data and the EPG data to the TV 33 and a VTR 34 (Video Tape Recorder) connected to the terminal device 2. Moreover, it can controls the operation for recording and reproducing the programs.

A broadcast wave of a program broadcast by the center device 1 is received by a tuner 15 through any of an antenna 3*c* for satellite broadcast, an antenna 4*b* for terrestrial wave and the CATV circuit 5, corresponding to form of program broadcast. The tuner 15 converts the received broadcast wave, which is tuned in a receiving frequency band selected by a user, into an IF (intermediate frequency) signal, and then transmits to a demodulation processor 16. The tuner 15 has circuits for converting the broadcast wave into the IF signal, form by form of program broadcast. The demodulation processor 16 demodulates the input signal. The demodulation processor 16 has demodulation circuits form by form of program broadcast.

The controller 23 extracts the image data and the audio data from the demodulated signal, and transmits to an image processor 19 and an audio processor 18, respectively. The image processor 19 decodes the image data to generate a program image data, performing a predetermined signal processing, outputting the image to the display 30 or the TV 33. The image processor 19 also has the function of overlapping character information and the like on the image of program displayed on the screen of the display 30 or the TV 33. A later-described data of the home page including EPG data is overlapped on the program image data by using the function of a WEB browser in the image processor 19, or replaced with the program image data, and outputted and displayed on the screen of the display 30 or the TV 33. On the other hand, the audio processor 18 decodes the input audio data, generating program audio data, performing a predetermined audio signal processing, outputting the audio to a speaker 29 or the TV 33.

The controller 23 establishes the connection to the Internet (public circuit 6) through a modem 22, in accordance with an instruction from the remote controller 31 or the input section 27. Then the controller 23 designates the predetermined URL of the home page including EPG data, and obtains EPG data of the home page on the WWW server of a provider (not shown) which is written in the form of HMTL or XML. At the preselected time for recording or viewing the program, the controller 23 establishes the connection to the Internet obtaining the EPG data of the home page again. The obtained EPG data of the home page is stored in a predetermined work area of a RAM 24, and also displayed on the screen of the display 30 or the TV 33, in accordance with instruction of the controller 23. Moreover, the EPG data of the home page is recorded in a DVD-R/W or a DVD-RAM through an HD (Hard Disc) drive 25 or through a DVD (Digital Versatile Disc) drive 26. If the center device 1 has the configuration shown in FIG. 3A, the controller 23 can obtain the EPG data of the home page through the CATV circuit 5 (a route indicated with the numeral 32 in FIG. 4).

The home page including the EPG data (the home page of a program guide) will be described below with reference to FIGS. 5 to 8. The home page including the EPG data displayed on the display 30 is described as an example, in the following explanation.

Figure 5:
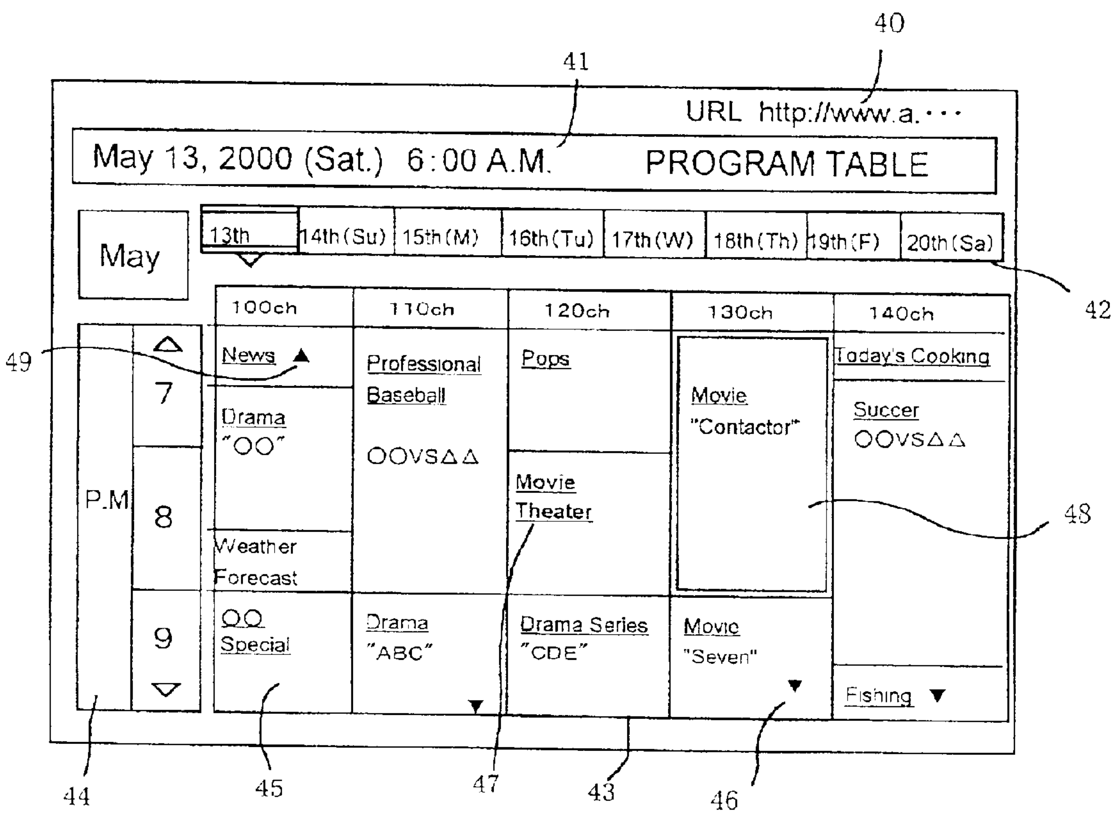
FIG. 5 is a view showing an example of a home page of a program table displayed on a display.

FIG. 5 shows an example of a page illustrating program table on the home page displayed on the display 30 (hereinafter, referred to as a program table page). The program table page shown in FIG. 5 illustrates a program table of a plurality of channels for each day (each day of the week). In the top portion (indicated with the numeral 40) of the program table page, URL of the home page of the program table is displayed. In the portion indicated with the numeral 41, a current date and time are displayed. A day tab 42 displays 8 days from the current day as shown in FIG. 5. In the example of FIG. 5, the day tab 42 indicating "13th (Saturday)" is selected, and the program table for the selected day is displayed within a program table display area 43. The program table is prepared for all the channels, for each day of the week. If a user clicks (selects) a desirable day on the day tab 42 by using a mouse or the like, the controller 23 obtains a program table data of the clicked day, through the modem 22 and the Internet, from the WWW server, and displays it on the program table page. Each unit which is displayed within the program table display area 43 and partitioned with a frame is referred to as a program cell 45. A time period display area 44 is positioned on the left side of the program table display area 43. In FIG. 5 the program table for the time period from 7:00 p.m. to 10:00 p.m. on May 13th (Saturday) is displayed. At the top portion of the program table display area 43, channel numbers are displayed in a horizontal direction. In FIG. 5 three hours of program table is displayed in time-axis direction, and five channels of program table is displayed in channel-axis direction. However, it is not limited to this configuration. For example, it can be designed so as to display longer time and many channels at one time.

A continuation mark 46 can be displayed in a program cell 45. The continuation mark 46 indicates that all of display area of the program cell 45 can not be displayed in a current program table display area 43 because the broadcast time of the program is long. The rest of the display area of the program cell 45 exists in the direction of the time-axis indicated by the mark 46. For example, although the broadcast time of the movie titled "Seven" starting at 9:00 p.m. in the 130-channel shown in FIG. 5 is two hours, the current program table display area 43 has the only area corresponding to the time period from 7:00 p.m. to 10:00 p.m. in FIG. 5. Therefore all of display area of the program cell 45 for the movie titled "Seven" can not be displayed completely. Hence, the fact that the program can continue even after 10:00 is indicated by using the continuation mark 46. An upward-pointing continuation mark 46 indicates that the time band of the program is longer than that is currently displayed on display area 43, and that the program cell 45 of the program continues in the upward direction (the direction indicating the preceding time band). A downward-pointing continuation mark 46 also indicates that the time band of the program is longer than that is currently displayed on the display area 43, and that the program cell 45 of the program continues in the downward direction (the direction indicating the succeeding time band). If each of those continuation marks is clicked by using the mouse or the like, a portion of the program cell 45 of the program which can not be currently displayed on the display area 43 is scrolled into view. A program cell 45 having a highlighting view as denoted by a numeral 48 (the view differentiating visually the program cell 45 from the other cells so as to discriminate the program cell 45 from the other cells) indicates an programming-set program (a later-described programming for recording or viewing the program). The program cell 45 of the program that the programming has been already set is highlighted.

Each program name in each program cell 45 is underlined, for example, to indicate that it is possible to click the program name by using the mouse or the like. Among those program names, for example, if "Movie Theater" denoted by a numeral 47 is clicked by using the mouse or the like, the controller 23 obtains home page data regarding detailed program information of "Movie Theater" through the Internet from the WWW server, in accordance with URL embedded in the position where the underlined program name is displayed as a link, and displays it on the display 30.

Figure 6A:
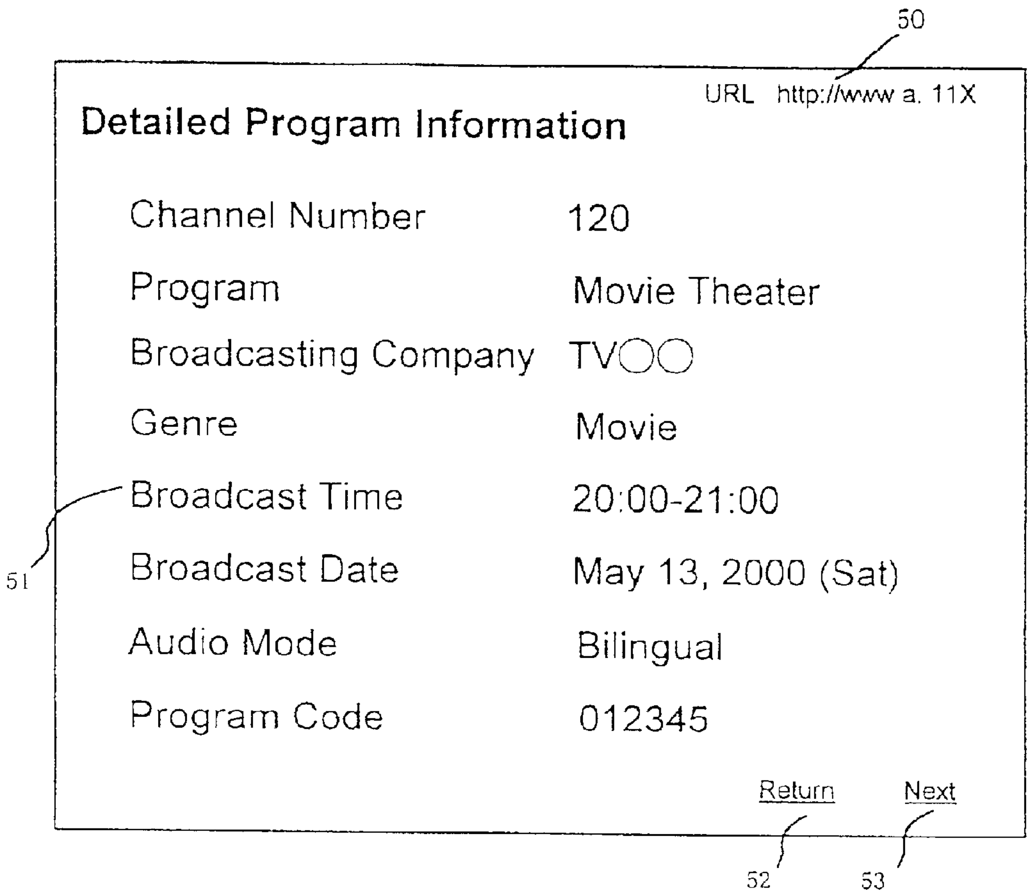
FIG. 6A is a view showing an example of a home page of a detailed program information displayed on a display.

FIG. 6A shows an example of a home page of a detailed program information displayed on the display 30 (hereinafter, referred to as a detailed program information screen). In the example shown in FIG. 6A the home page shows a detailed program information of "Movie Theater", and a top portion (denoted by a numeral 50) of the detailed program information screen indicates URL of the home page displaying the detailed program information screen. The detailed program information includes information regarding a name of a broadcasting corporation of "Movie Theater", a genre of the program and the like, as shown in FIG. 6A. A broadcast time 51 indicates a time of a broadcast schedule of the program. A bottom portion of the detailed program information screen indicates a return command 52 and a Next command 53. If the return command 52 is clicked by using the mouse, the screen returns back to the program table screen shown in FIG. 5. If the Next command 53 is clicked, the controller 23 obtains home page data of the next page of the detailed program information screen shown in FIG. 6A from the WWW server, and displays it on the display 30.

Figure 6B:
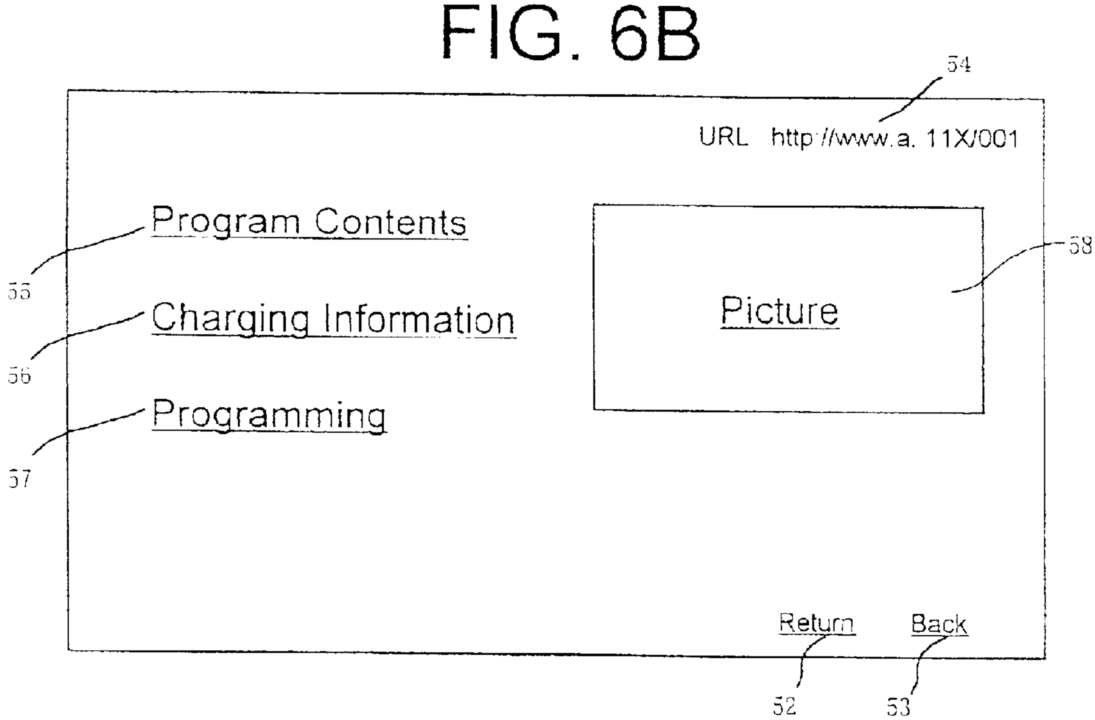
FIG. 6B is a view showing an example of the next page of the home page shown in FIG. 6A displayed on a display.

FIG. 6B shows an example of the next page of a detailed program information screen displayed on the display 30. In the example shown in FIG. 6B, a top portion (denoted by a numeral 54) of the detailed program information screen also shows URL indicating the home page of the detailed program information screen of this page. The detailed program information screen indicates a program contents command 55 for displaying contents of "Movie Theater", a charging information command 56 for displaying charging information, a programming command 57 for programming for recording or viewing the program and the like. If each of those commands is clicked by using the mouse or the like, the controller 23 obtains corresponding home page data from the WWW server, and displays it on the display 30. A displaying window 58 denoted by a numeral 58 shown in FIG. 6B displays a picture regarding "Movie Theater" and the like. If the picture is clicked, the other information in relation to "Movie Theater" can also be displayed. Commands for displaying a later-described "Complementary Information" and the like are additionally displayed on the detailed program information screen shown in FIG. 6B as necessary.

Figure 7A:
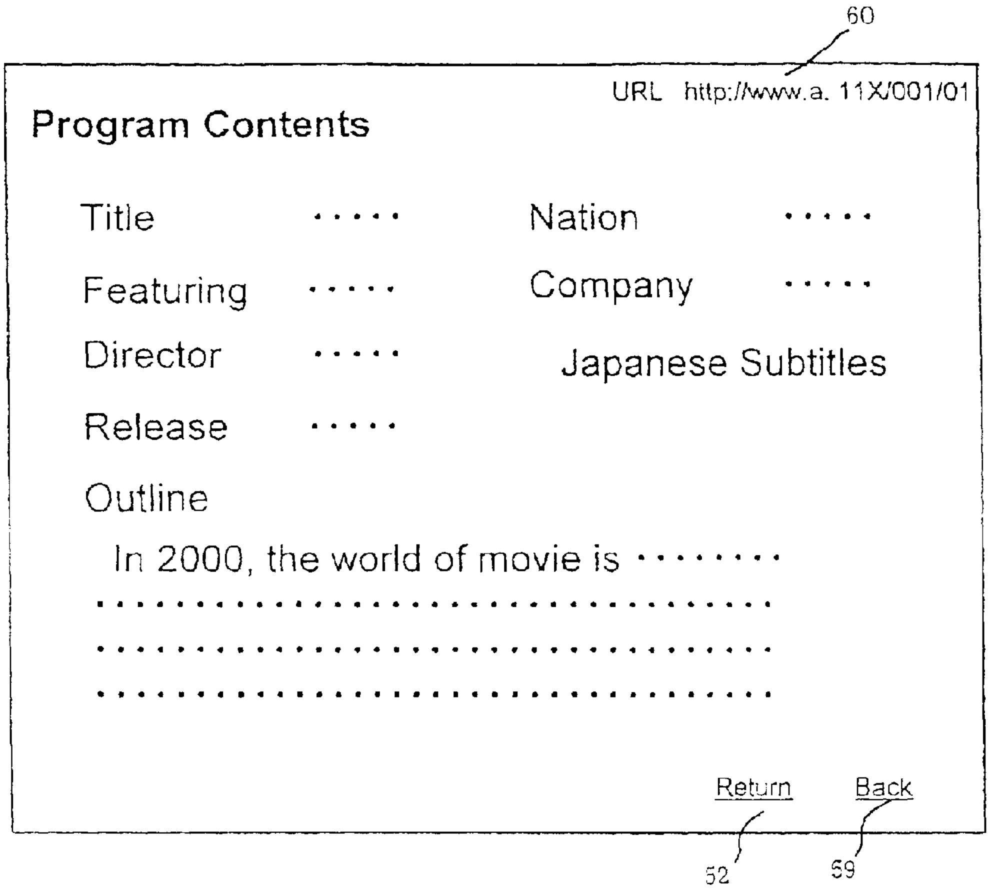
FIG. 7A is a view showing an example of a home page of a program contents displayed on the display.
Figure 7B:
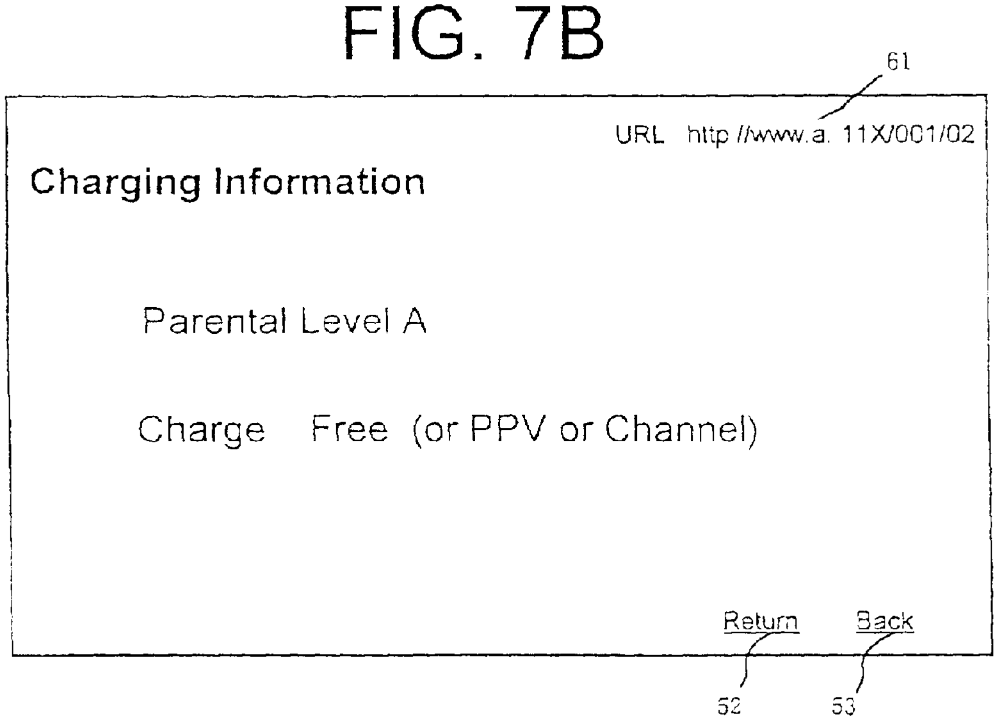
FIG. 7B is a view showing an example of the next page of the home page shown in FIG. 7A displayed on a display.

FIG. 7A shows an example of a home page of the program contents (hereinafter, referred to as a program contents screen) displayed on the display 30 by clicking the program contents command 55, and FIG. 7B shows an example of a home page of the charging information (hereinafter, referred to as a charging information screen) displayed on the display 30 by clicking the charging information command 56, respectively. Top portions (denoted by numerals 60, 61) of the program contents screen and the charging information screen indicate the corresponding URLs respectively. The program contents screen indicates the detailed contents including an outline of "Movie Theater" and the like. The charging information screen also indicates a parental level (the level regarding an age limit for viewing) of "Movie Theater" and an information to discriminate between a pay program and a free-of-charge program.

Figure 8:
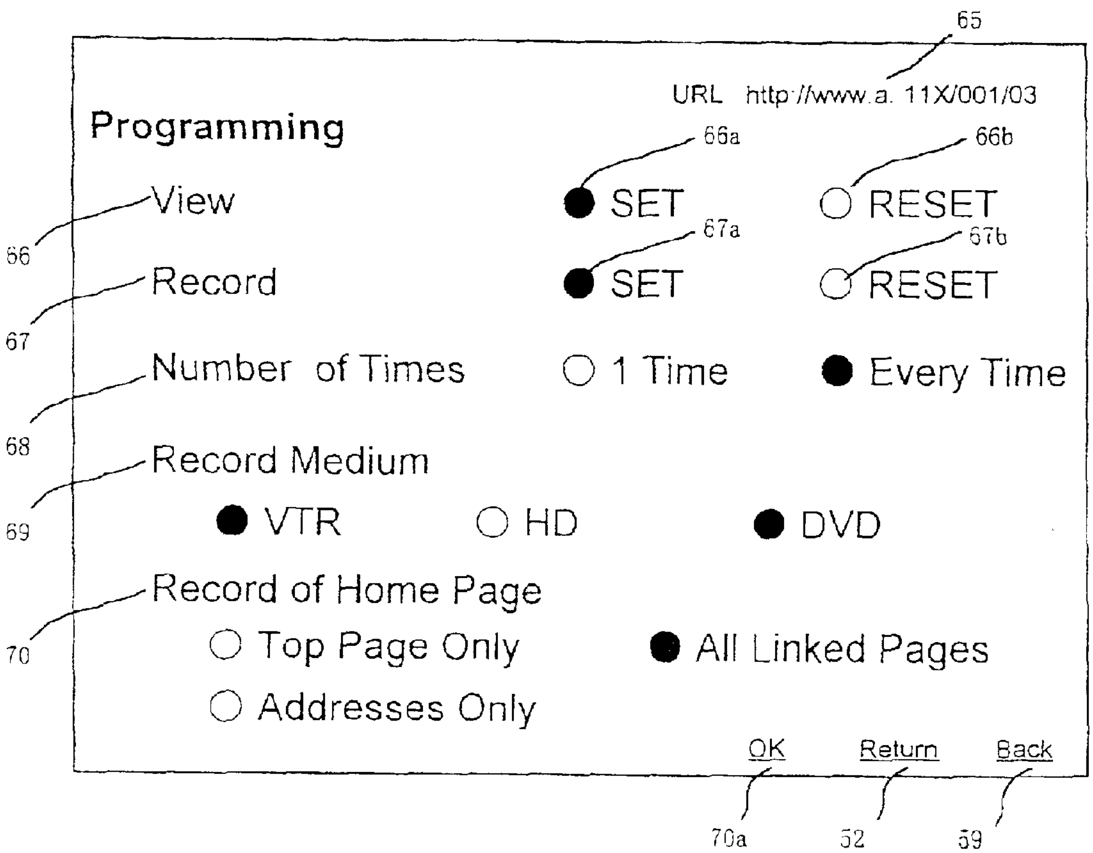
FIG. 8 is a view showing an example of a home page of the setting of programming displayed on a display.

FIG. 8 shows a home page of the setting of programming (hereinafter, referred to as a setting of programming screen) displayed on the display 30 by clicking the programming command 57. The example of FIG. 8 indicates that the setting is now performed or the setting has been already done, as described later. At an initial state, a mark 66*a* and the other circles are not selected, and each circle is represented by a white (the color indicating at non-set states).

A top portion (denoted by a numeral 65) of the setting of programming screen indicates URL of the home page of it. The setting of programming for recording or viewing the scheduled program is performed on the setting of programming screen. If he setting of programming for viewing is performed, at the set time the set channel of the program is automatically received so that the audio data or the image data of the program is outputted to the speaker 29, the display 30 or the TV 33. Namely, the setting of programming for viewing enables the program to be automatically displayed on the display 30 or the TV 33 even if the user forgets the broadcast time of the program. If the setting of programming for recording the program is performed, at the set time the set channel of the program is automatically received so that the audio data or the image data of the program is outputted to an HD drive 25, a DVD drive 26 and a VTR 34 and recorded on them. For example, if the setting of programming for recording "Movie Theater" is performed, at the broadcast start time (20:00) of the program the controller 23 receives a 120-channel, and starts recording the received contents. Then at the broadcast end time (21:00) the controller 23 stops recording the received contents.

In the example of FIG. 8, a mark 66*a* indicated on the left of a selecting section indicated with the name of "SET" in a menu option indicated with the name of "View" 66 (hereinafter referred to a View option 66) is displayed as a block circle. Then, a mark 66*b* indicated on the left of a selecting section indicated with the name of "RESET" in the View option 66 is displayed as a white circle. In this state, the programming for viewing the program is set. If the mark 66*b* is clicked by using the mouse or the like, the representation of the mark 66*b* is changed from the white circle to the black circle, and the representation of the mark 66*a* is changed from the black circle to the white circle. Consequently, the programming for viewing is reset.

In a menu option indicated with the name of "Record" 67 (hereinafter referred to a Record option 67) shown in FIG. 8 as in the case of the View option 66, if a mark 67*a* indicated on the left of a selecting section indicated with the name of "SET" in the Record option 67 is displayed as a block circle, the programming for recording the program is set.

In a menu option indicated with the name of "Number of times" 68 (hereinafter referred to a Number option 67) shown in FIG. 8, if the programming is set in the View option 66 and the Record option 67, it is set whether the program is automatically received only one time in the date and time corresponding to the time band which is clicked on the program table screen shown in FIG. 5 or received in the time band every week. For example, if a program to be broadcast in the date and time corresponding to the time band clicked on the program table screen is one of a series of programs to be broadcast every week, the program is received and recorded on VTR or the like at that time band every week by clicking a mark indicated on the left of a selecting section indicated with the name of "Every time" in the Number option 67 (so that the representation of the mark becomes a black circle). This setting of the Number option 67 is not limited to an every week. It may be set for every day or every month.

In a menu option indicated with the name of "Record medium" 69 (hereinafter referred to a Record medium option 69) shown in FIG. 8, if the programming for recording the program is set in the Record option 67, each of mediums on which the contents of the program is recorded is selected. In the example shown in FIG. 8, each of VTR, HD and DVD can be selected as the record medium. A plurality of record mediums on which the program is recorded can be selected by the click operation using the mouse or the like. For example, VTR and DVD are selected (a mark indicated on the left of a selecting section indicated with the name of "VTR" and a mark indicated on the left of a selecting section indicated with the name of "DVD" in the Record medium option 69 are clicked so that the representations of the marks are changed to a black circle) in the example shown in FIG. 8. Thus, at the broadcast start time of the program, the controller 23 outputs a signal for recording the program, to a VTR 33 and a DVD drive 26. Hence, the contents of the program is recorded on a video tape in the VTR 33 and a DVD in the DVD drive 26.

Figure 9:
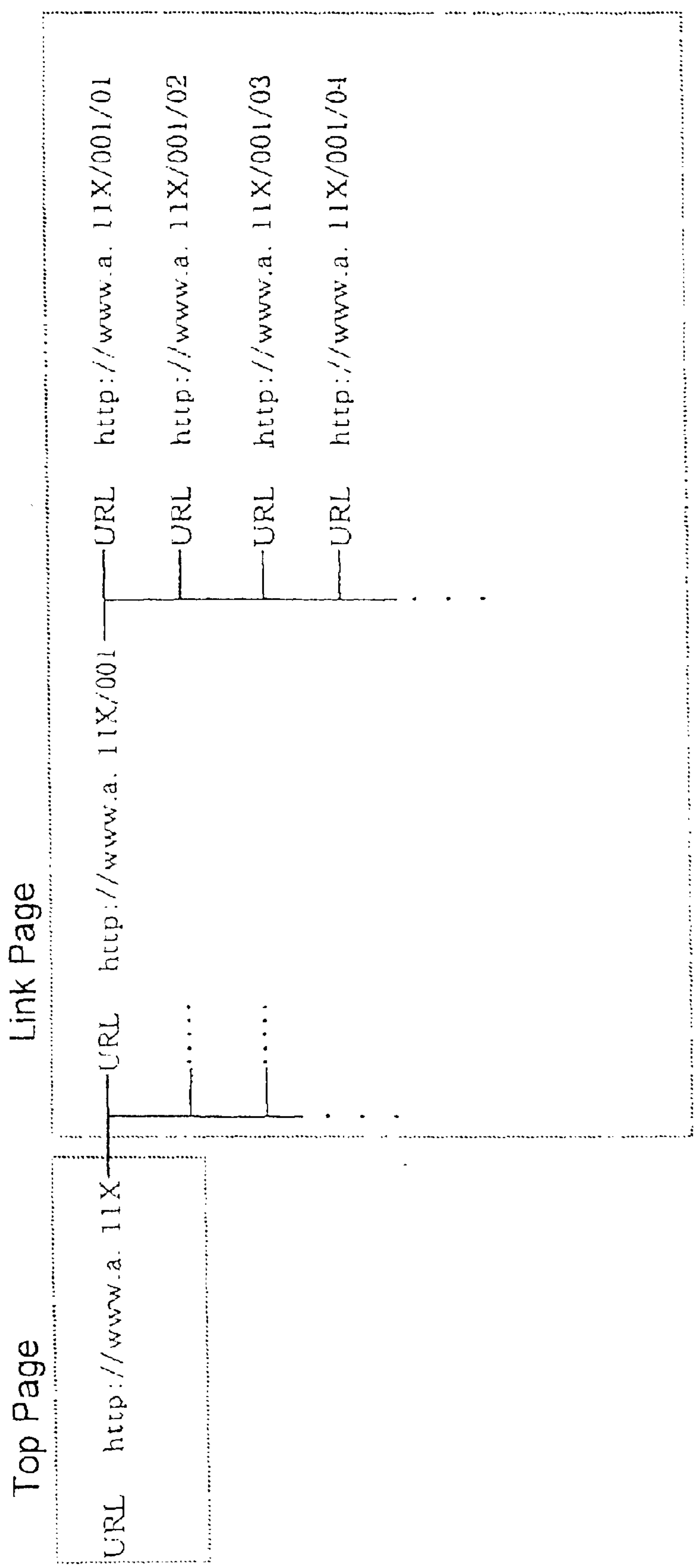
FIG. 9 is a view showing link information of the home page of the detailed program information.

In a menu option indicated with the name of "Record of the home page" 70 (hereinafter referred to a Home page record option 70) shown in FIG. 8, it is set how the home pages of the programs shown in FIGS. 6 and 7 with the contents of the programs are recorded on the specified record medium. The above-mentioned home pages shown in FIGS. 6 and 7 are linked to each other, as shown in FIG. 9. The home page of the detailed information of the program shown in FIG. 6A indicates a top page. The home pages shown in FIGS. 6B, 7A and 7B and the added home page indicate the linked pages. If a mark indicated on the left of a selecting section indicated with the name of "Only Top Page" in the Home page record option 70 is clicked and the representation of the mark is changed to a black circle, the screen of only the top page shown in FIG. 6A (HTML or XML text data) and URL are recorded on HD, DVD or the like. If a mark indicated on the left of a selecting section indicated with the name of "All Link Pages" in the Home page record option 70 is clicked and the representation of the mark is changed to a black circle, all screens of the link page shown in FIG. 9 (HTML or XML text data) and URL are recorded on HD, DVD or the like. If a mark indicated on the left of a selecting section indicated with the name of "Only Address" in the Home page record option 70 is clicked and the representation of the mark is changed to a black circle, only all URLs except the screen of the link pages and the top page shown in FIG. 9 (the HTML or XML text data) are recorded on HD, DVD or the like. If those data can not be recorded on the VTR or the like, they may be recorded on HD or the like.

As mentioned above, the contents set on the screen of the programming for recording reservation shown in FIG. 8 is determined by clicking an OK command 70*a*. The contents together with the various information of the URL, the program name, the broadcast time and date, the broadcast channel and the like is recorded on the HD by the controller 23, as the programmed information. If the programming is set in the View option 66 and the record option 67, its contents can be checked by using a list table. It may be designed such that each time when a mark is clicked on the setting of programming screen shown in FIG. 8 by using the mouse or the like, the controller 23 recognizes it and then records the set contents. For example, it may be designed such that the return command 52 or the Back command 59 shown on the bottom portion of FIG. 8 is clicked, the controller 23 collectively records the set contents. The representations of the settings shown in FIG. 8 are carried out by a process for representing a page performed in the terminal device 2, in accordance with the various settings (the settings recorded on the HD or the like). This does not imply that a change is added to the home page data itself within the WWW server.

FIG. 10 shows an example of the screen of the programmed contents list displayed on the display 30. The screen is prepared by the controller 23, in accordance with the programmed information recorded on the HD, if the programming is set on the View option 66 and the Record option 67 of the setting of the program screen shown in FIG. 8. The screen of the programmed contents list is prepared in accordance with the data of the detailed information of the program shown in FIG. 6A or the data of the program contents screen shown in FIG. 7A. A programming category section 71 shown in FIG. 10 indicates whether a programming category is a programming for viewing or a programming for recording. A media section 72 indicates a designated medium used for recording if the category is the programming for recording. A set date and time 73 indicates the date and time of a program broadcast schedule. Thus, the user can check the programmed contents by carrying out a predetermined operation of the input section 27. If the contents of the programming is changed on the setting of programming screen shown in FIG. 8, the changed contents are displayed on the setting of programming screen.

At the broadcast start time of the program which is programmed for viewing on the setting of programming screen shown in FIG. 8, the controller 23 receives the program (tunes in to the channel of the program), and outputs it to the display 30. At the broadcast start time of the program which is programmed for recording, the controller 23 receives the program (tunes in to the channel of the program), and outputs it for recording its contents on the HD drive 25 and the like. Moreover, at the broadcast start time of the program which is programmed for viewing and recording, the controller 23 establishes the connection to the Internet through the modem 22, and newly obtains a home page data of EPG from the WWW server. At the broadcast start time of the program which is programmed, the controller 23 may obtain the home page data of the EPG at any time between the broadcast start time and the broadcast end time.

Figure 11:
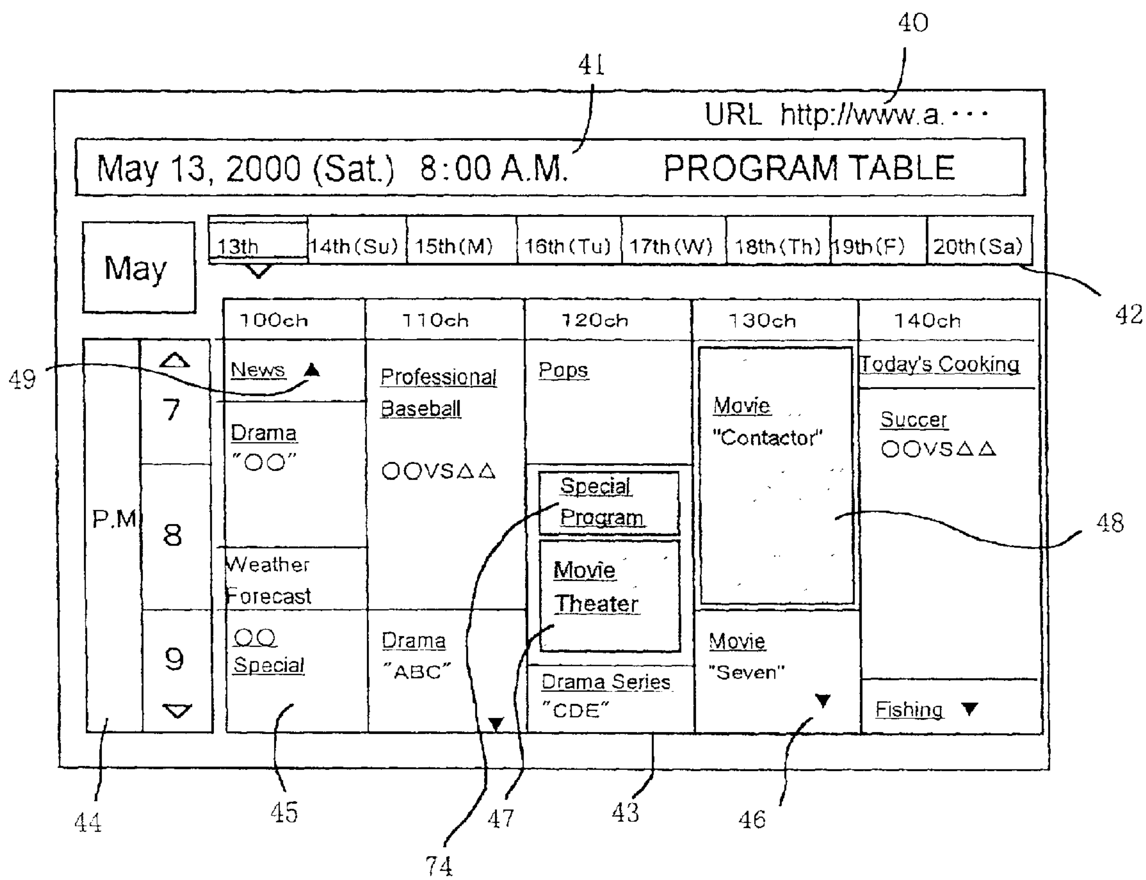
FIG. 11 is a view showing an example of a home page of a program table obtained when a broadcast start time of a reservation program is reached.
Figure 12A:
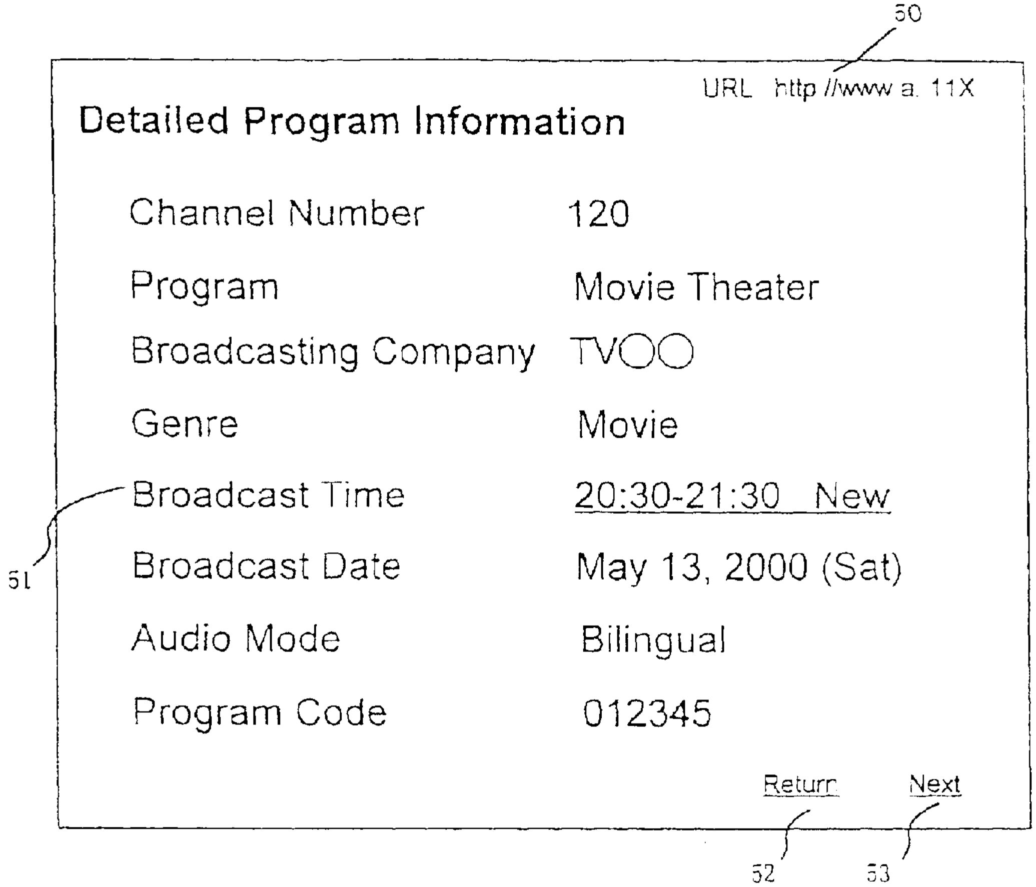
FIG. 12A is a view showing an example of a home page of a detailed program information obtained at a broadcast start time of a set program.
Figure 12B:
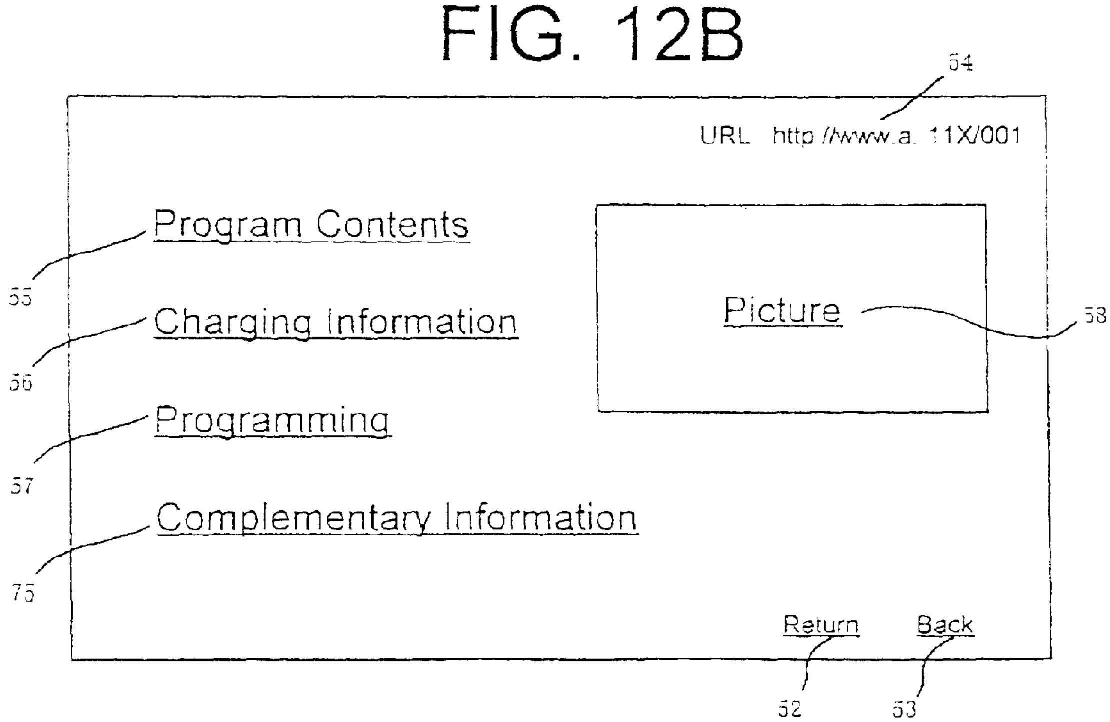
FIG. 12B is a view showing an example of the next page of the detailed program information shown in FIG. 12A.
Figure 13:
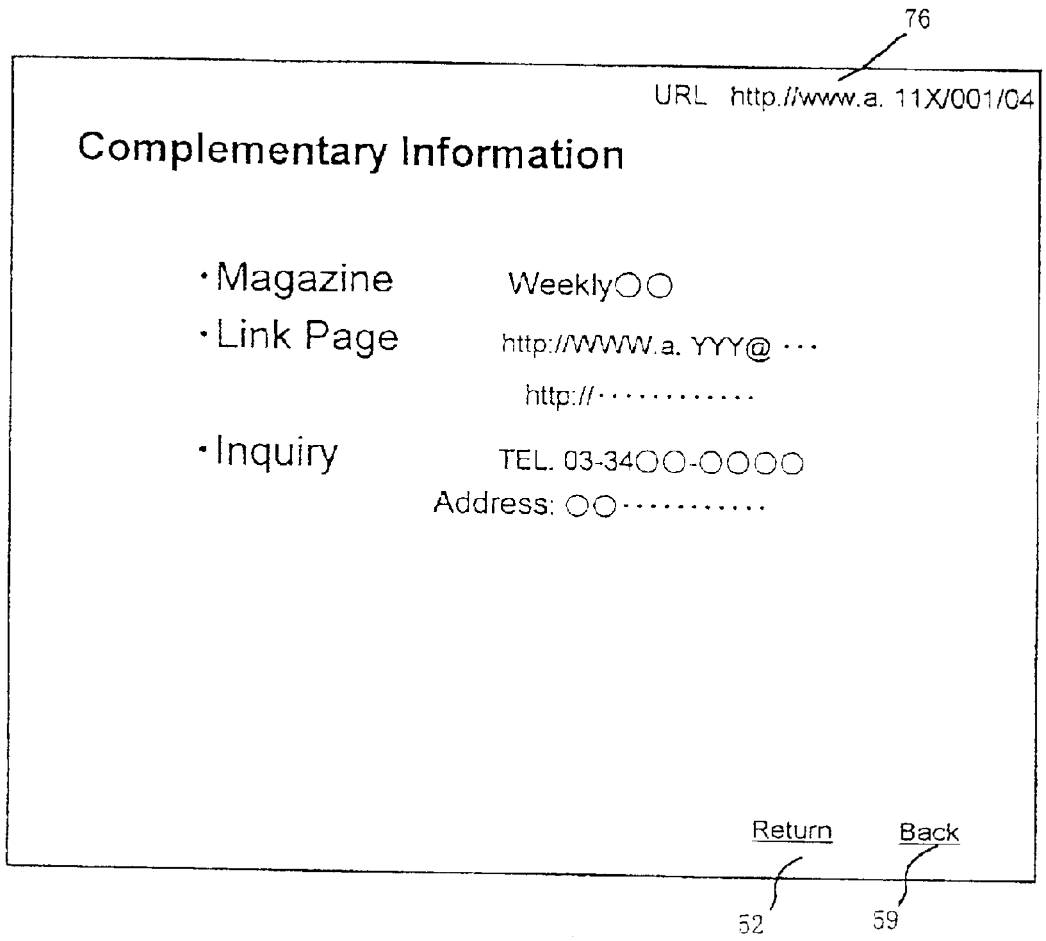
FIG. 13 is a view showing an example of a home page of a complementary information obtained at a broadcast start time of a reservation program.

FIGS. 11 to 13 show examples of the home pages of EPG obtained at the time between the broadcast start time and the broadcast end time. As shown in FIG. 11, the broadcast start time "20:00" of "Movie Theater" denoted by the numeral 47 displayed on the program table screen which is obtained in advance and shown in FIG. 5 is changed and moved down to "20:30". This is because "Special Program" denoted by a numeral 74 of FIG. 11 is inserted into a time band between "20:00" and "20:30". Consequently, the broadcast time band of "Movie Theater" is changed from "20:00–21:00" into "20:30–21:30". For example, if the programming for recording of "Movie Theater" has been set, the controller 23 changes the recording time band from "20:00–21:00" into "20:00–21:30", in response to such a broadcast time change. Thus, "Movie Theater" shown in FIG. 11 is recorded to the end without being interrupted. "Special Program" inserted into the broadcast time band of "Movie Theater" is recorded from the broadcast start time of "Movie Theater" together with "Movie Theater". However, it may be designed such that the controller 23 changes the recording time band from "20:00–21:00" into "20:30–21:30" in response to such a broadcast time change and does not record "Special Program". Or, since there may be some cases that it is not desirable to automatically postpone the recording period as mentioned above, the recording operations can be carried out in accordance with the time schedule set at the time of the programming. A processing method at a time of such a broadcast time change may be selectively configured. Associated with this, a broadcast time band of a broadcast time 51 on the detailed information of programming screen shown in FIG. 12A is changed and displayed. A home page data of a detail information with regard to this newly inserted special program (the data corresponding to FIGS. 6 to 9) is also recorded on the HD, the DVD, or the like, in accordance with the setting of the home page recording option 70 shown in FIG. 8.

Moreover, complementary information 75 is additionally displayed on the program contents screen shown in FIG. 12B, as can be understood from a comparison with FIG. 6B. When the complementary information 75 is clicked by using the mouse or the like, the controller 23 obtains a home page data of a complementary information from the WWW server, and displays a complementary information screen on the display 30, as shown in FIG. 13. The information displayed on the complementary information screen is the information added at a time of a program broadcast. This includes, for example, the information, such as a name of a magazine introducing the broadcast program, a related home page address (URL) and the like, and further an inquiry destination with regard to the broadcast program and the like. This home page data of the complementary information is also recorded on the HD, the DVD or the like, in accordance with the setting on the home page recording option 70 shown in FIG. 8. Then, the programming information recorded on the HD is updated and added as the execution result of the programming, in accordance with those newest information.

As mentioned above, at the broadcast start time of the program which is programmed for viewing and recording, the controller 23 automatically establishes the connection to the Internet, and newly obtains the home page data of the EPG from the WWW server. Thus, renewed information can be recorded and provided to the user. The controller 23 can suitably change the set time of the programming for recording initially set by the user and the like, in accordance with the renewed information. Hence, it is possible to largely reduce the labor for a change procedure by the user.

FIG. 14A shows an example of the record contents list screen displayed on the display 30. The record contents list screen is the screen for displaying the contents of the program recorded on the HD or the like through the programming for recording. The record contents list screen is prepared in accordance with the data of the program contents screen or the data of the detailed program information screen of the programming information which is updated and added within the HD by the controller 23, as is the case with the screen of the programmed contents list shown in FIG. 10. The recorded medium is displayed in a media section 80 shown in FIG. 14A. A date and time when the program is broadcast is displayed on a recording date and time 81. If the user clicks a program which the user wants to view, for example, "English Conversation" denoted by a numeral 82, on the record contents list screen by using the mouse or the like, the controller 23 reads out the image data and the audio data of the program from a medium (HD) on which the program is recorded, and outputs to the speaker 29, the display 30 or the TV 33. Thus, the user can easily search and view the program for which the programming for recording has been set. If the screen is prepared in accordance with the home page data of the EPG transmitted in a form of XML, a desirable program can be searched by using a keyword of a performer of the program and the like. Hence, it is possible to easily attain a collective management of a library of the programs recorded by the user. Moreover, if a home page is recorded, it can be reproduced and viewed from the recorded medium. If only an address of a home page is recorded, it can be obtained and viewed from the WWW server, in accordance with its address.

The record contents list screen can be displayed in the recorded order, the Japanese syllabary order, the channel order or the like. A program can be also searched on the basis of items. It may be configured to highlight a frame of the program selected on the record contents list screen. Moreover, any information (including the display of the complementary information shown in FIG. 13) can be displayed on the record contents list screen if it is the information of the program included in the home page data of the EPG.

FIG. 14B shows an example of a record contents list screen displayed on the display 30, when a broadcast start time of a program which is programmed for recording is changed. As mentioned above, when a broadcast time band of the program which is programmed for recording is changed, the program is recorded corresponding to such a change. However, contents of such a change are reflected on the record contents list screen as shown in FIG. 14B. For example, as it is already described with reference to FIG. 11, if "Special Program" is inserted into the broadcast time band at the time of the programming for recording "Movie Theater" and recorded together with "Movie Theater", information indicating the fact that "Special Program" is recorded is inserted into a portion denoted by a numeral 83 shown in FIG. 14B. A change mark indicating the fact that "Special Program" which is not included in the programming information at the time of the programming for recording is recorded because of the change of the broadcast time band is displayed on a portion denoted by a numeral 84 shown in FIG. 14B. Thus, the user can easily recognize the fact of such a change and the contents of the change, even in the case of the change in the broadcast time band of the program which is programmed for recording.

It can be determined whether or not the program is included at the time of the programming for recording or it is the changed program in accordance with the name of the program or the comparison with the URL of the home page of the detailed program information. If a unique program code is given to the program, the determination can be performed in accordance with it.

The data of the respective record positions of the home pages and the programs in the record medium are recorded on the record contents list screen(not shown). At a time of a reproduction, the search and the reproduction can be performed in accordance with the data. The data of the record position includes, for example, a file name and the like in the case of the HD, a file name, an address, a time code and the like in the case of the DVD, and a time code and the like in the case of the VTR.

Figure 15:
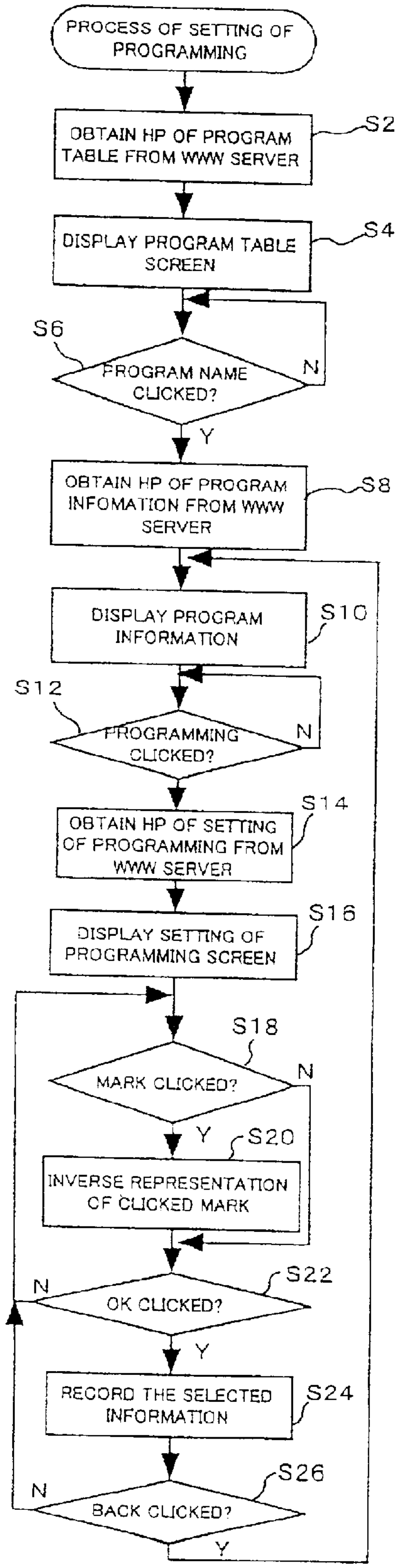
FIG. 15 is a flow chart showing a process in a terminal device when programming for recording or viewing is set.

A process of the terminal device 2 in setting of programming for recording or viewing the program will be described below with reference to a flow chart shown in FIG. 15.

At first, if the user activates the terminal device 2 using the input section 27 and carrying out a prescribed operation, the controller 23 establishes the connection to the Internet through the modem 22 corresponding to the prescribed operation, and obtains a home page data of a program table from the WWW server of the provider, in an HMTL or XML form, in accordance with URL of a home page of the program table prepared in advance (Step S2). The home page data of the obtained program table is displayed on the display 30 by using the browser function of the image processor 19 (Step S4). Accordingly, if a program name within a program cell is clicked under the condition that the home page of the program table is displayed as shown in FIG. 5, the controller 23 detects this (Step S6), and specifies URL of a home page of a detailed program information corresponding to such a program, and then obtains the home page data of the detailed program information from the WWW server, through the modem 22, in the HMTL or XML form. The home page data of the obtained detailed program information is displayed on the display 30 as is the case with the home page of the program table. In this way, if the next page command 53 is clicked under the condition that the information is displayed as shown in FIG. 6A, the home page shown in FIG. 6B is accessed from the WWW server (Step S8), and displayed on the display 30 (Step S10). Then, if the programming command 57 of the home page of the detailed program information shown in FIG. 6B is clicked, the controller 23 detects this (Step S12), and specifies URL of a home page of the setting of programming, and obtains a home page data of the setting of programming through the modem 22 from the WWW server, in the HMTL or XML form (Step S14). The home page data of the obtained setting of programming is displayed on the display 30, as shown in FIG. 8 (Step S16).

Under those conditions, the controller 23 monitors the click of each mark in the set items of the View option 66, the Record option 67, the Number option 68, the Record medium option 69 and the Home page record option 70. Then, if a mark is clicked, the controller 23 detects it (Step S18), and inverts the representation of the clicked mark (the inversion from the representation of a white mark to the representation of a black mark, or the inversion from the representation of the black circle to the representation of the white circle) (Step S20). The controller 23 determines whether or not the OK command 70*a* is clicked (Step S22). If detecting the click of the determination command 70*a*, the controller 23 determines the contents corresponding to the clicked mark, and records them as programming information on the HD (Step S24). For example, if the mark 67*a* is clicked on the Record option 67, the controller 23 records a broadcast start time and a broadcast end time of the program as programming information of programming for recording on the HD. At this time, the controller 23 records the information shown in FIGS. 6A and 7A with regard to the program which is programmed for recording as the reservation information on the HD. The programming information recorded on the HD serves as the sources of the programming contents list screen shown in FIG. 10 and the record contents list information shown in FIG. 14, and recorded in a form of table.

If the previous page command displayed on the bottom portion of the home page of the programming for recording shown in FIG. 8 is clicked, the detailed program information shown in FIG. 6B is displayed (Step S26). If the return command is clicked, the home page of the program table shown in FIG. 5 is displayed. If the program contents command 55 is clicked on the home page of the detailed program information shown in FIG. 6B, the home page of the program content shown in FIG. 7A is displayed on the display 30. If the charging information command 56 is clicked, the home page of the charging information shown in FIG. 7B is displayed on the display 30. However, those processes are omitted in the flow chart shown in FIG. 15.

Figure 16:
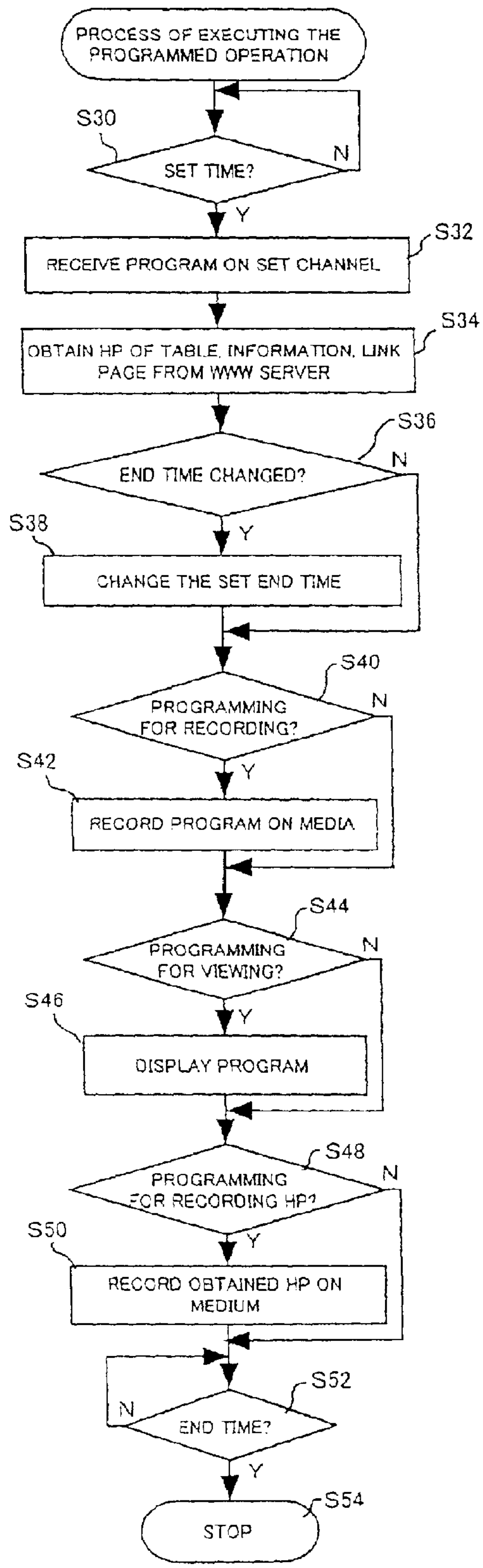
FIG. 16 is a flow chart showing a process in a terminal device when programming for recording or viewing is carried out.

The process of the terminal device 2 in executing the programmed operation will be described below with reference to a flow chart shown in FIG. 16.

Under the above-mentioned conditions, the controller 23 monitors programming information and a current time, and determines whether or not a start time of the program which is programmed for viewing and recording (Step S30). At the set start time, the controller 23 receives the program of the set channel through the tuner 15 (Step S32). Then, the controller 23 establishes the connection to the Internet through the modem 22, and obtains the home page data in the HMTL or XML form from the WWW server of the provider, in accordance with the program table and the detailed program information which is obtained in advance, and URL of a home page linked to it (Step S34). The obtained home page data is overwritten onto and stored in a previously obtained home page data. At this time, the home page data or the URL (address) is stored by the method set in the section of the Home page record command 70 on the setting of programming screen shown in FIG. 8. The home page data is obtained for all programs broadcast within the set recording time at the time of programming. If the above-mentioned special program or the set program is replaced with another program, its alternate program is obtained. The programming information recorded in the HD is updated in accordance with those home page data. However, it may be designed such that a program whose name is different from that at the time of programming, such as a special program or the like, and its home page are not recorded (the information shown in FIG. 14B is recorded even in this case).

Next, the controller 23 refers to the home page data of the obtained detailed program information determining whether or not the program broadcast time is changed (Step S36). Namely, it is determined whether or not the broadcast time of the program is moved down to a later time and thereby the broadcast end time of the program is changed, since a program such as a special program or the like is inserted or a program such as a baseball broadcast is extended, as mentioned above. If it is determined that the program broadcast time has been changed, a programming information recorded in the HD is updated in order to change the setting of the broadcast end time of the program (Step S38). Next, the controller 23 determines whether or not the programming for recording the program is set (Step S40). If it is determined that the programming for recording the program is set, the controller 23 starts recording the set program on the record medium set in the section of the Record medium option 69 on the setting of programming screen shown in FIG. 8 (Step S42). Next, the controller 23 determines whether or not the programming for viewing the program is set (Step S44). If it is determined that the programming for viewing the program is set, the controller 23 outputs the audio data of the received program through the audio processor 18 to the speaker 29, and the image data through the image processor 19 to the display 30 (or the TV 33), respectively (Step S46). Next, the controller 23 determines whether or not the programming for recording the home page is set (Step S48). If it is determines that the programming for recording the home page is set, the controller 23 records the obtained home page on the set record medium, under the condition set on the setting of programming screen shown in FIG. 8 (Step S50). At this time, if there is an information added to the contents of the obtained home page data at the Step S32, for example, if the complementary information shown in FIG. 13 is added, such home page data is also recorded. Then, the controller 23 determines whether or not it becomes the program end time (Step S52). If it becomes the program end time, the operation for recording and outputting the program is stopped (Step S54).

In the above-mentioned explanations, if there is free space in the record medium and the broadcast time is changed, unless a broadcast time band of another program which is programmed for recording and viewing does not overlap, or even if the time band overlaps, only in a time band that does not overlap the program may be recorded. If the set program is not found within the set time, any program is searched in a time close to it, for example, a range within an hour after the set time by the identification of a program name, a program code or the like. Then the searched program may be recorded.

A timing when the home page is obtained is basically a point of a set time and a point of a broadcast start time of a program within the set time. It is a start point of a desirable program when a program schedule is not changed. In the example of FIG. 14B, the home page of the special program is obtained at the start point of the special program, and the home page of the movie theater is obtained at the start point of the movie theater. However, for example, all the home pages of the programs within the set time may be obtained at the point of the set time.

Figure 17:
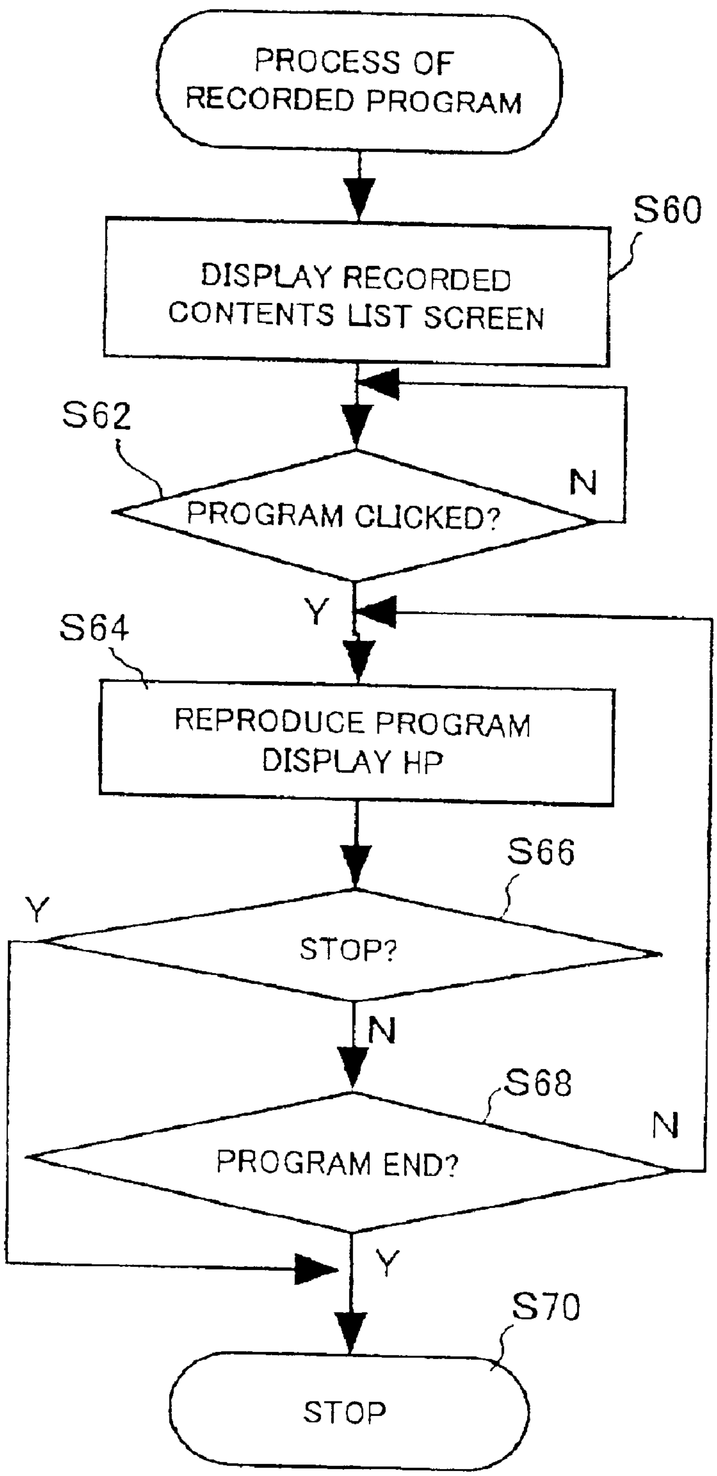
FIG. 17 is a flow chart showing a process in a terminal device when a set program is reproduced.

The process of the terminal device 2 in reproducing the program which is programmed for recording will be described below with reference to a flow chart of FIG. 17.

At first, if the user uses the input section 27 and carries out a prescribed operation, the controller 23 reads out an information with regard to a recorded program from a programming information recorded in the HD, corresponding to the prescribed operation, and prepares the record contents list screen shown in FIG. 14A, and then displays it on the display 30 (Step S60). Here, if there is a change in a broadcast time of a program which is programmed for recording, the changed contents are reflected as shown in FIG. 14B. Next, if the user clicks a program which the user wants to view by using the mouse or the like, the controller 23 detects this (Step S62), and reads out the clicked program from its record medium, and then reproduces it using the speaker 29 and the display 30 (or the TV 33) (Step S64). Then, it is determined whether or not predetermined reproduction and stop operations are performed (Step S66). If the stop operation is performed, the reproduction of the program is finished (Step S70). On the other hand, if the stop operation is not performed, it is determined whether or not the program is finished (Step S68). If it is finished, the reproduction of the program is automatically finished (Step S70). The user can freely display the recorded home page or its address by carrying out a prescribed operation.

The above-mentioned embodiment is designed such that at the broadcast start time of the set program the controller 23 establishes the Internet and then obtains the home page of the EPG from the WWW server. However, another method may be configured as follows. Namely, the controller 23 automatically accesses the Internet at a periodical time, for example, at a predetermined time every day, and then obtains the home page of EPG from the WWW server. Then, the controller 23 compares it with a previously obtained home page data which is recorded as a programming information recorded in the HD, and determines whether or not there is any change or addition in its contents. If there is the change or the addition, the controller 23 updates the contents of the programming information, and then changes the settings of programming for viewing and recording. In a case of such configuration, even if a broadcast start time of a program is changed so as to be broadcast earlier, the program can be designed to be recorded completely.

If there is any change in the broadcast time of the program, or if there is any change in the program name although there is no change in the broadcast time of the program, it may be configured to display the information indicating the change or the addition on the display 30 or the TV 33, or output the information from the speaker 29.

In the above-mentioned embodiment, the setting of programming is performed by clicking the program name within the program table shown in FIG. 5. However, the present invention can be applied to a system in which, for example, a user uses the remote control, the keyboard or the like, and sets a channel number of a program and a date and time thereof, and then carries out the setting of programming.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. P2000-72464 filed on Mar. 10, 2000 including the specification, claims, drawings and summary is incorporated herein by reference in its entirety.

What is claimed is:

1. An apparatus for recording program information comprising:

a program information obtaining device for obtaining program information including at least program names, broadcast start times, program lengths or program end times, and broadcast channels of a plurality of programs;

a program guide providing device for providing a program guide to a user on the basis of the obtained program information;

a storing device for storing at least the broadcast start time, the program length or the broadcast end time, and the broadcast channel with regard to a program selected by the user on the basis of the provided program guide;

a reception contents recording device for receiving the broadcast channel of the selected program in a period within the program length after the broadcast start time, or in a period by the broadcast end time from said broadcast start time, and recording the reception contents;

a newest program information obtaining device for newly obtaining the program information with regard to the selected program in a period while the reception contents are recorded;

a program information recording device for recording the newly obtained program information; and a displaying device for displaying, to the user, the newly obtained program information and a change mark indicating the newest program information which was not included in the programming information selected by the user.

2. An apparatus according to the claim 1, wherein the reception contents recording device receives the broadcast channel of the selected program and records the reception contents in accordance with a changed program length or a changed broadcast end time if the program length of the broadcast time or the broadcast end time included in said newly obtained program information by said newest program information obtaining device is changed against the program length of the broadcast time or the broadcast end time included in said obtained program information by said program information obtaining device.

3. An apparatus according to the claim 1, wherein the apparatus further comprising a reception contents providing device for providing reception contents of the program recorded by said reception contents recording device to the user on the basis of the program information recorded by the program information recording device.

4. An apparatus according to the claim 1, wherein said newest program contents information obtaining device periodically obtains the program information in regard to the selected program in addition to the period for recording the reception contents by said reception contents recording device.

5. A method of recording program information, comprising the processes of:

obtaining program information including at least names, broadcast start times, program lengths or program end times, and broadcast channels of a plurality of programs;

providing a program guide to a user on the basis of the obtained program information;

storing at least the broadcast start time, the program length or the broadcast end time, and the broadcast channel with regard program to a program selected by the user on the basis of the provided program guide;

receiving the broadcast channel of the selected program in a period within the program length after the broadcast start time, or in a period by the broadcast end time from said broadcast start time, and recording the reception contents;

newly obtaining the program information with regard to the selected program in a period while the reception contents are recorded;

recording the newly obtained program information; and displaying, to the user, the newly obtained program information and a change mark indicating the newest program information which was not included in the programming information selected by the user.

6. A method according to the claim 5, wherein the process of recording reception contents receives the broadcast channel of the selected program and records the reception contents in accordance with a changed program length or a changed the broadcast end time if the program length of the broadcast time or the broadcast end time included in said newly obtained program information by the process of obtaining said newest program information is changed against the program length of the broadcast time or the broadcast end time included in said obtained program information by the process of obtaining said program information.

7. A method according to the claim 5, wherein the method further comprising the process of providing a reception contents of the program recorded by said process of recording the reception contents to the user on the basis of the program information recorded by the process of recording the program information.

8. A method according to the claim 5, wherein said process of obtaining newest program contents information periodically obtains newest program contents information in regard to the selected program in addition to the period for recording the reception contents by said process of recording the reception contents.

9. The apparatus according to claim 1, wherein the reception contents recording device receives the broadcast channel of the selected program and records the reception contents in accordance with a changed program length or a changed broadcast end time when the program length of the broadcast time or the broadcast end time, included in said newly obtained program information, is changed as compared against the program length of the broadcast time or the broadcast end time included in said obtained program information by said program information obtaining device, and wherein the reception contents recording device receives the broadcast channel of the selected program and records the reception contents, in accordance with the changed program length or the changed broadcast end time, when the reception contents recording device has free space for recording the newly obtained program.

10. The method according to the claim 5, further comprising:

receiving the broadcast channel of the selected program and recording the reception contents in accordance with a changed program length or a changed broadcast end time when the program length of the broadcast time or the broadcast end time, included in said newly obtained program information, is changed as compared against the program length of the broadcast time or the broadcast end time included in said obtained program information, and wherein receipt of the broadcast channel of the selected program and recording of the reception contents, in accordance with the changed program length or the changed broadcast end time, is performed when there is free space for recording the newly obtained program.

11. The apparatus according to claim 9, wherein the reception contents recording device receives the broadcast channel of the selected program and records the reception contents, in accordance with the changed program length or the changed broadcast end time, when the reception contents recording device has free space for recording the newly obtained program, and a broadcast time band of another program which is programmed for recording does not overlap with the changed program length.

12. The apparatus according to claim 9, wherein the reception contents recording device receives the broadcast channel of the selected program and records the reception contents, in accordance with the changed program length or the changed broadcast end time, when the reception contents recording device has free space for recording the newly obtained program, and wherein, when a broadcast time band of another program which is programmed for recording overlaps with the changed program length, the reception contents recording device only records the newly obtained program in a time band that does not overlap the broadcast time band of the another program.

13. The method according to claim 10, wherein receipt of the broadcast channel of the selected program and recording of the reception contents, in accordance with the changed program length or the changed broadcast end time, is performed when there is free space for recording the newly obtained program, and a broadcast time band of another program which is programmed for recording does not overlap with the changed program length.

14. The method according to claim 10, wherein receipt of the broadcast channel of the selected program and recording of the reception contents, in accordance with the changed program length or the changed broadcast end time, is performed when there is free space for recording the newly obtained program, and wherein, when a broadcast time band of another program which is programmed for recording overlaps with the changed program length, recording of the newly obtained program is only performed in a time band that does not overlap the broadcast time band of the another program.

* * * * *